Figure 19:
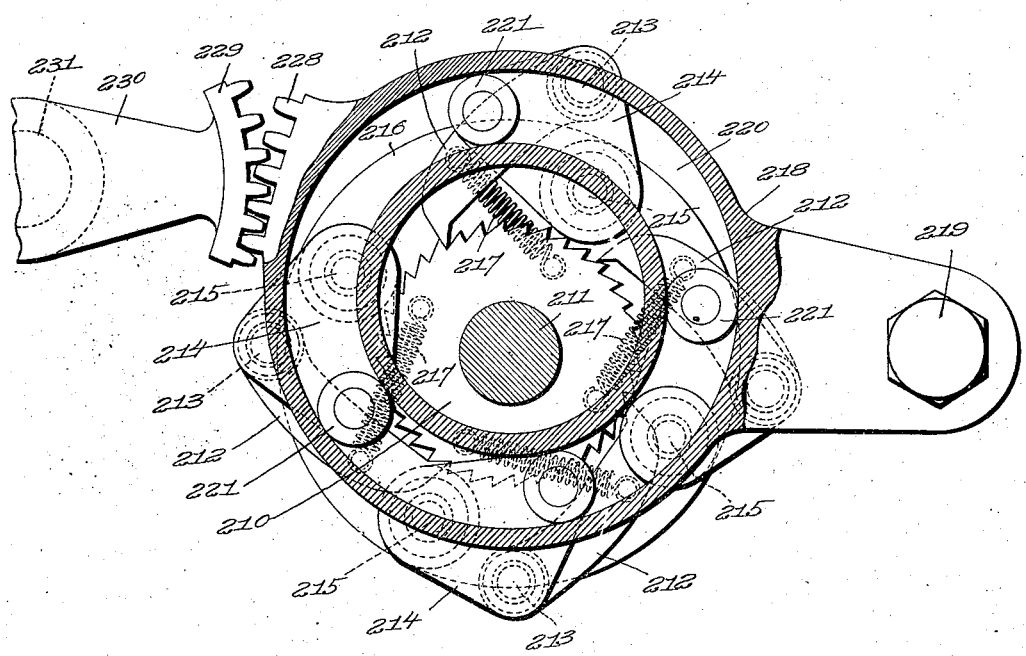

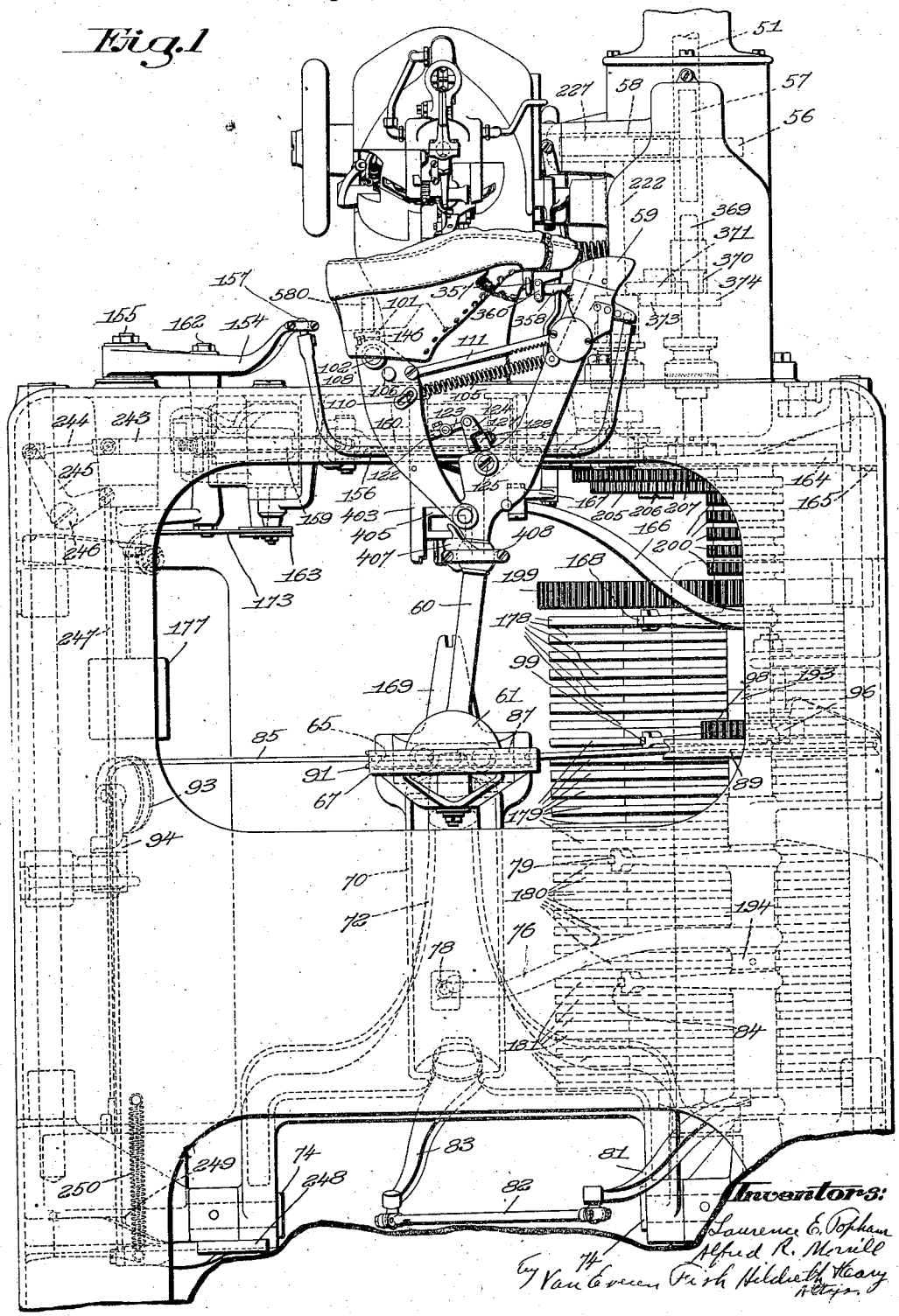

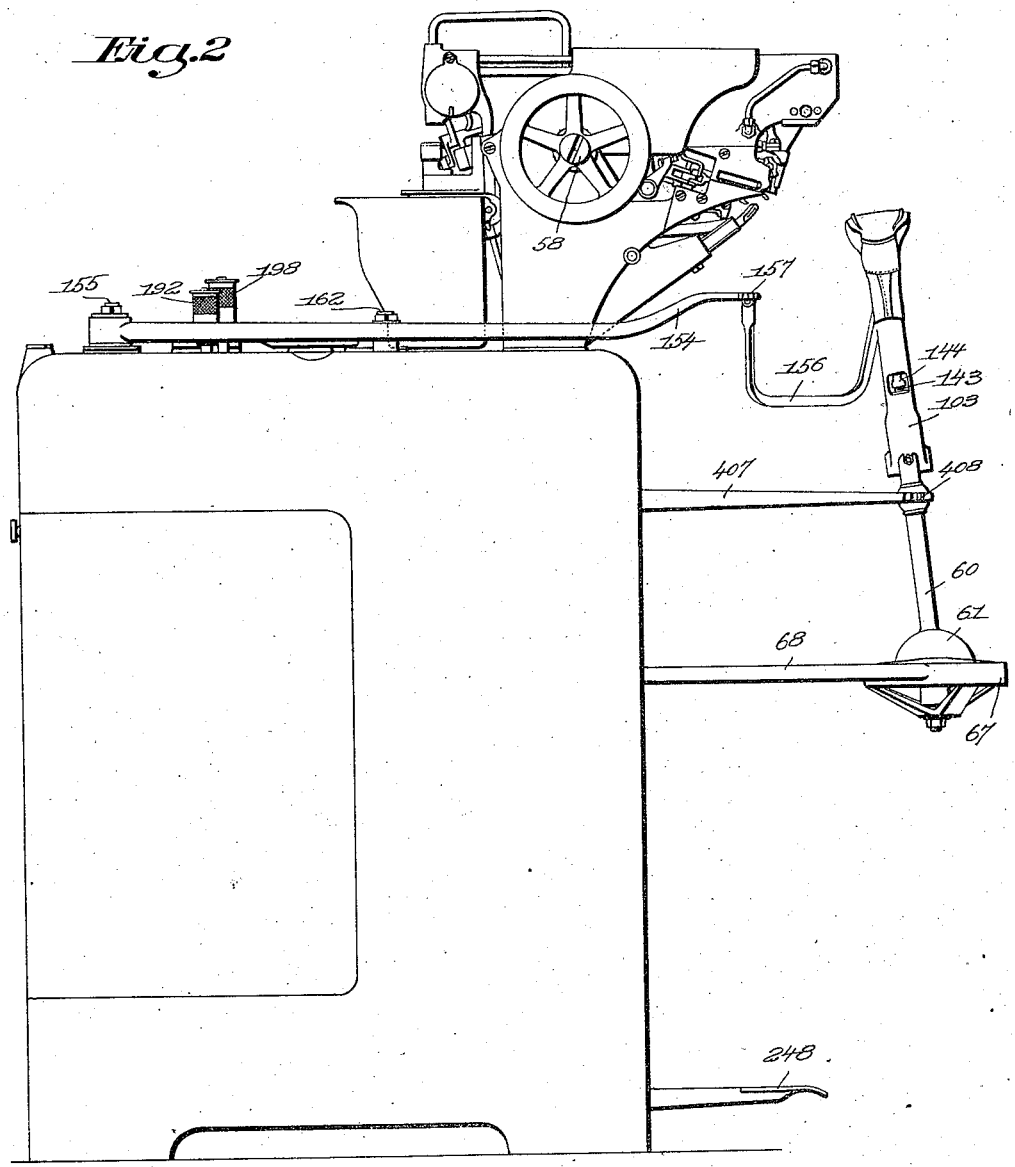

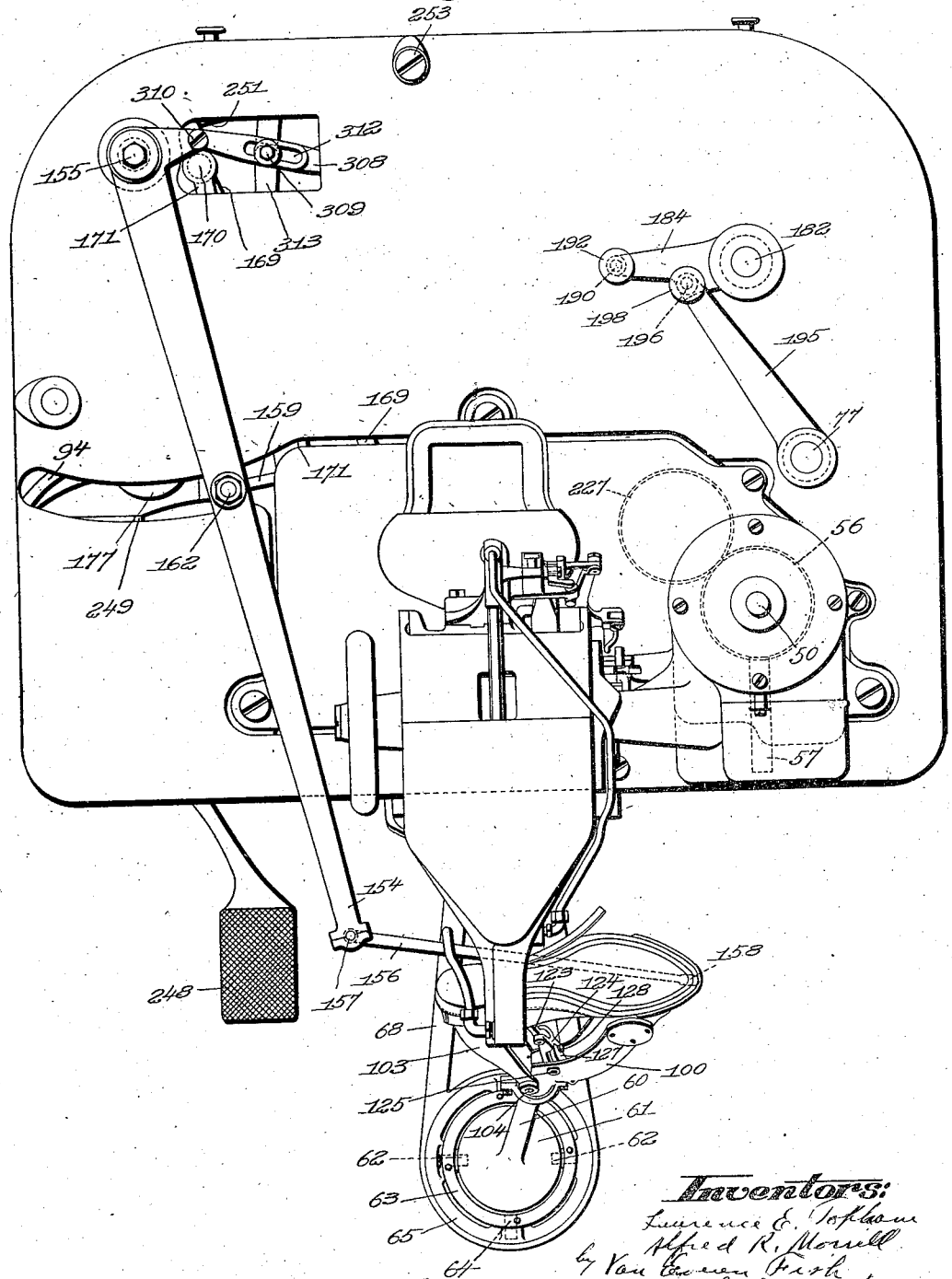

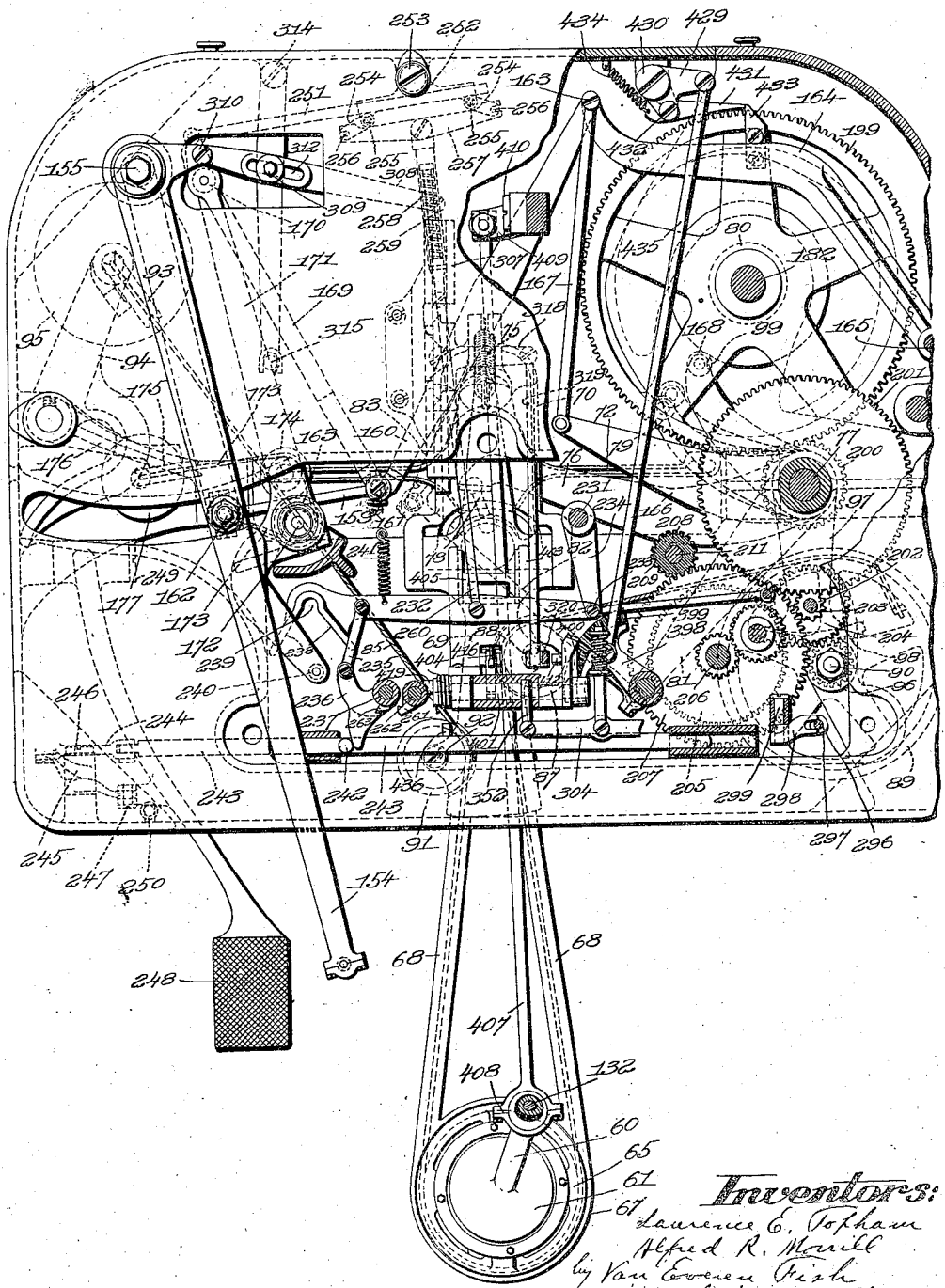

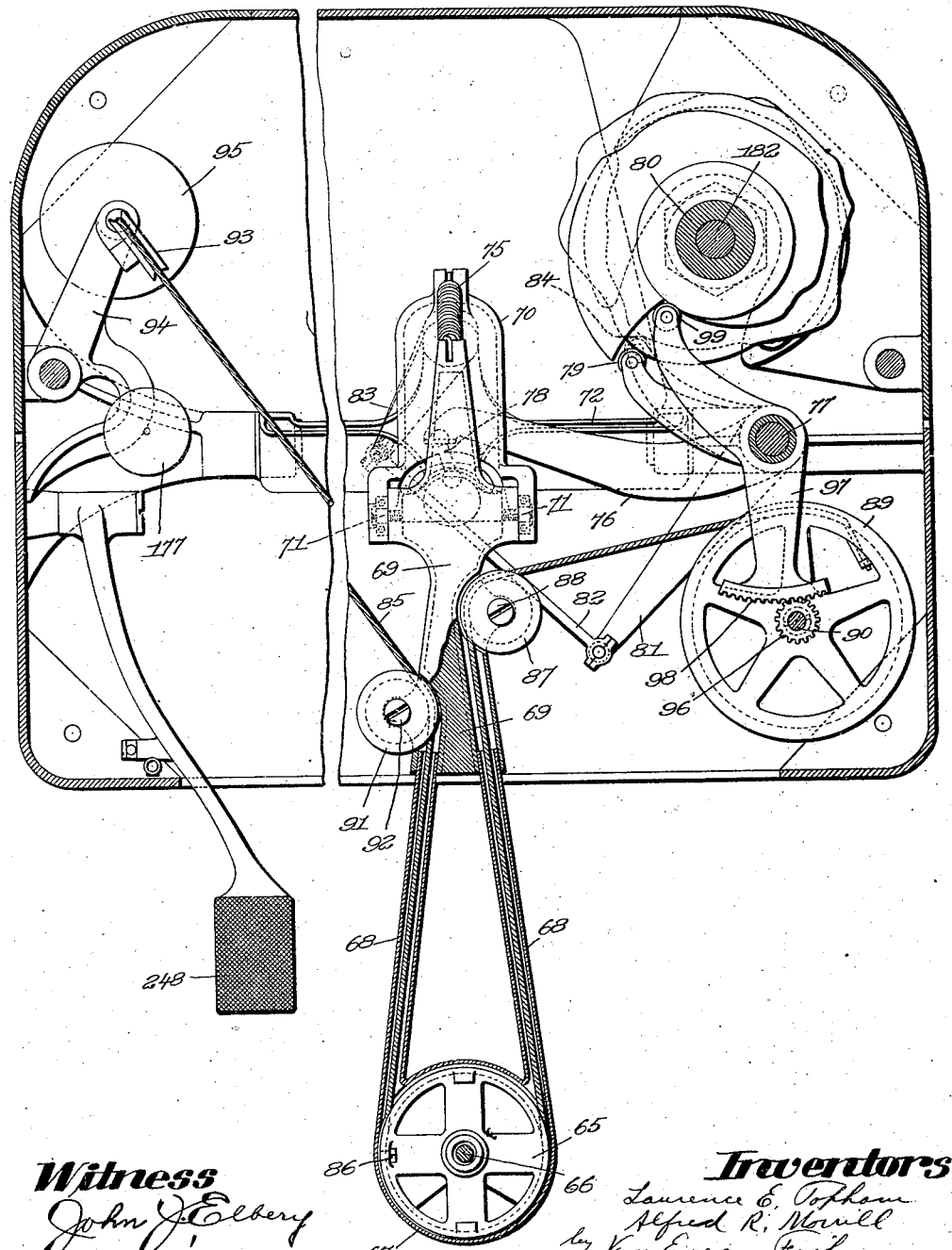

Feb. 8, 1927.
L. E. TOPHAM ET AL
1,616,719
SHOE MACHINE
Original Filed July 21, 1919   21 Sheets-Sheet 6

Witness
John J. Colbury

Inventors
Lawrence E. Topham
Alfred R. Morrill
By Van Everen Fish
Hildreth Hawry
Attys Feb. 8, 1927.
L. E. TOPHAM ET AL
1,616,719
SHOE MACHINE
Original Filed July 21, 1919    21 Sheets-Sheet 7
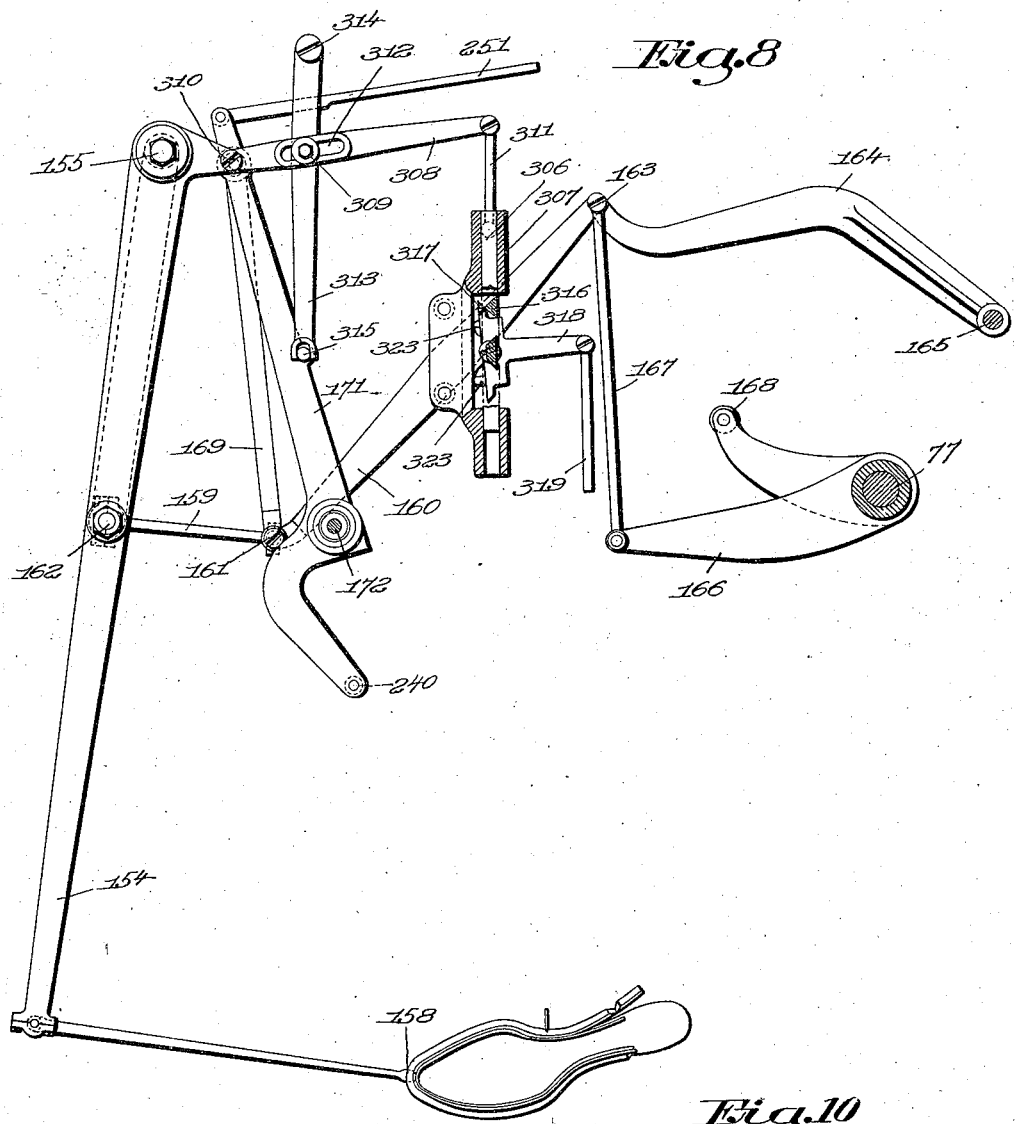
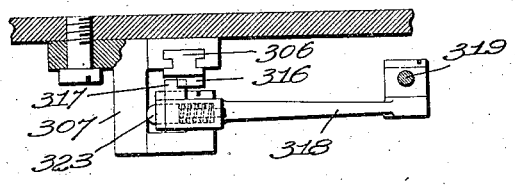
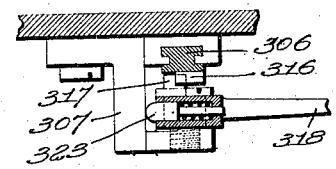
Inventors:
Lawrence E. Topham
Alfred R. Morrill
by Van Everen Fish
Hildreth Hary Attys

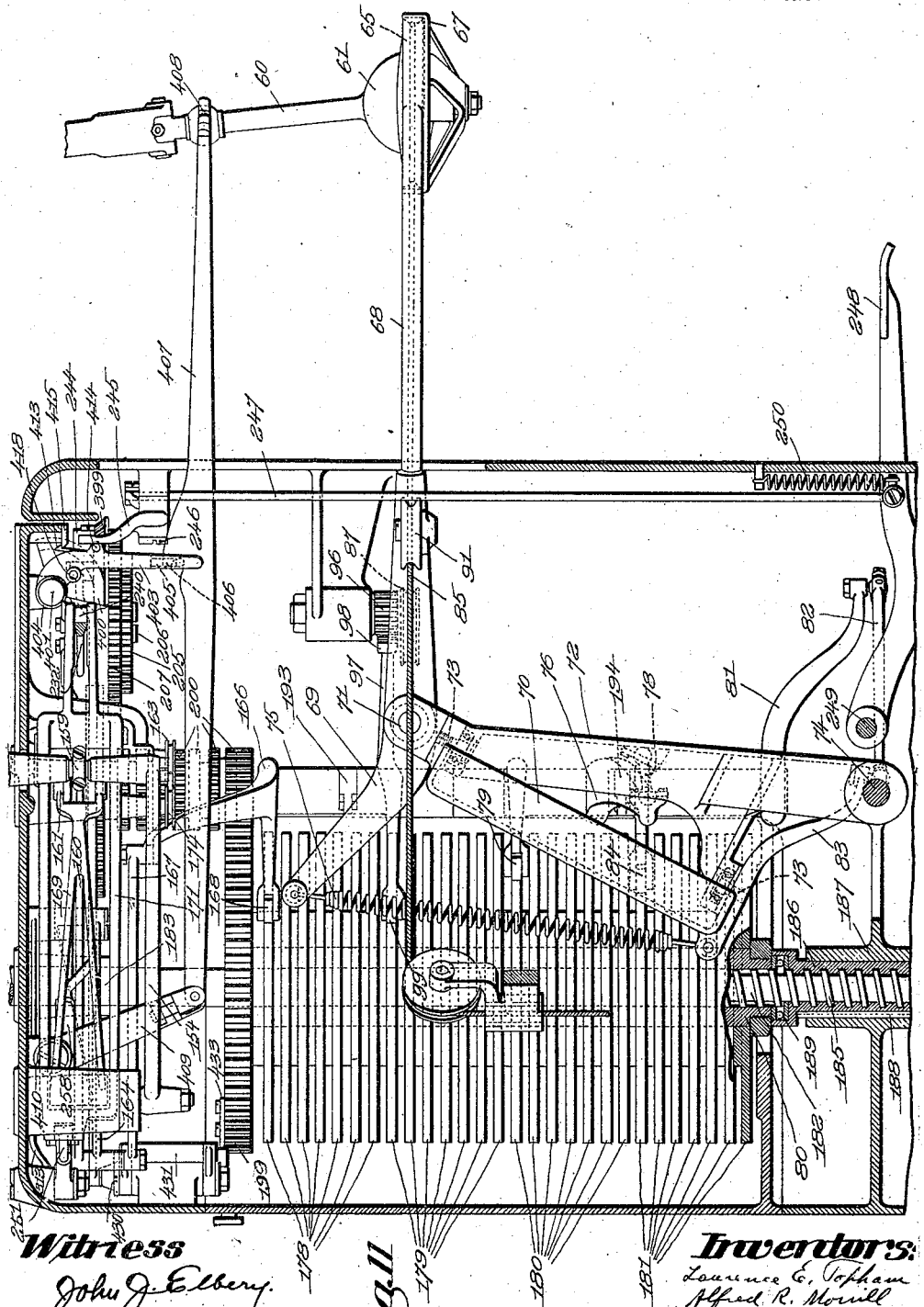

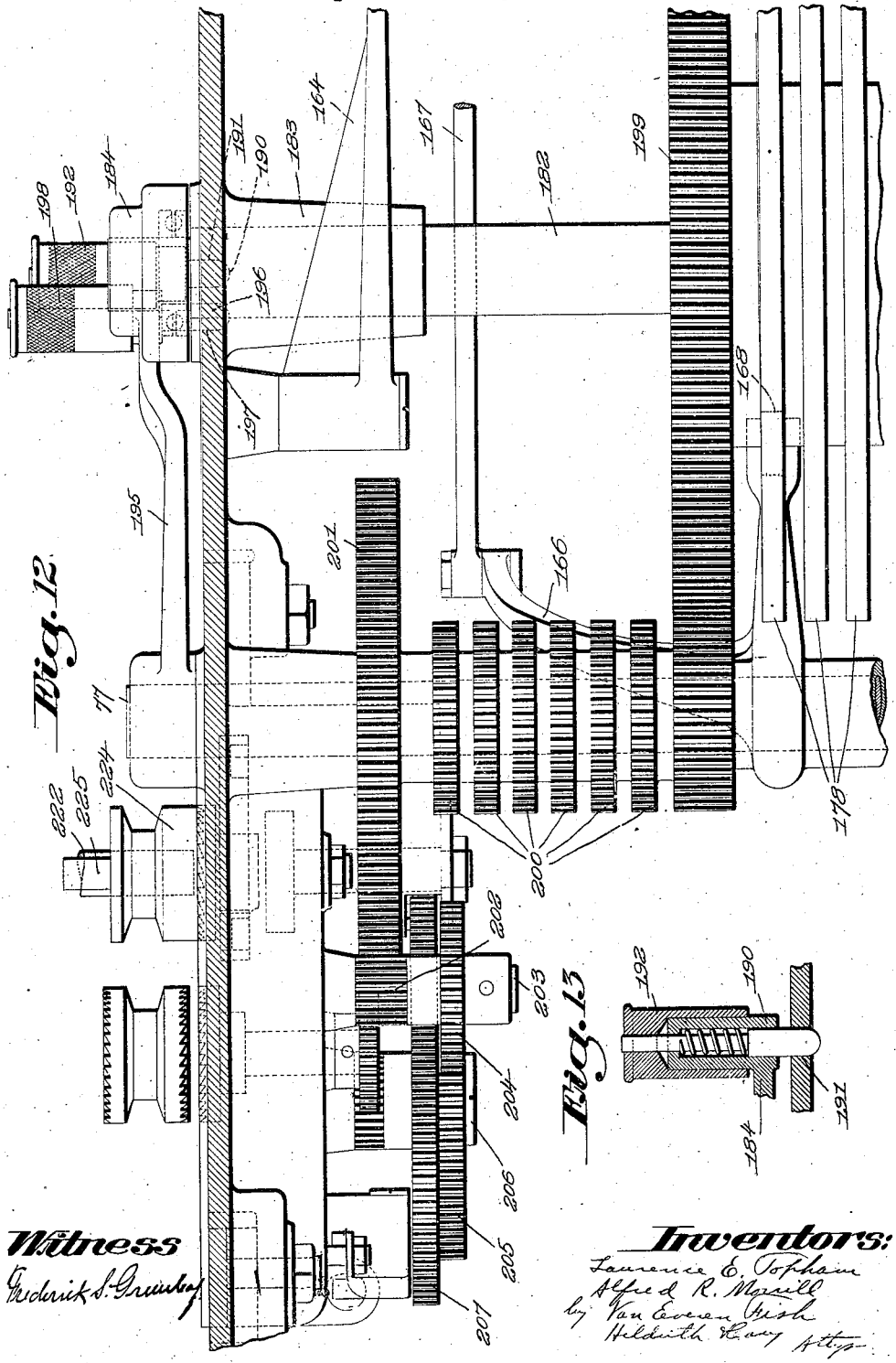

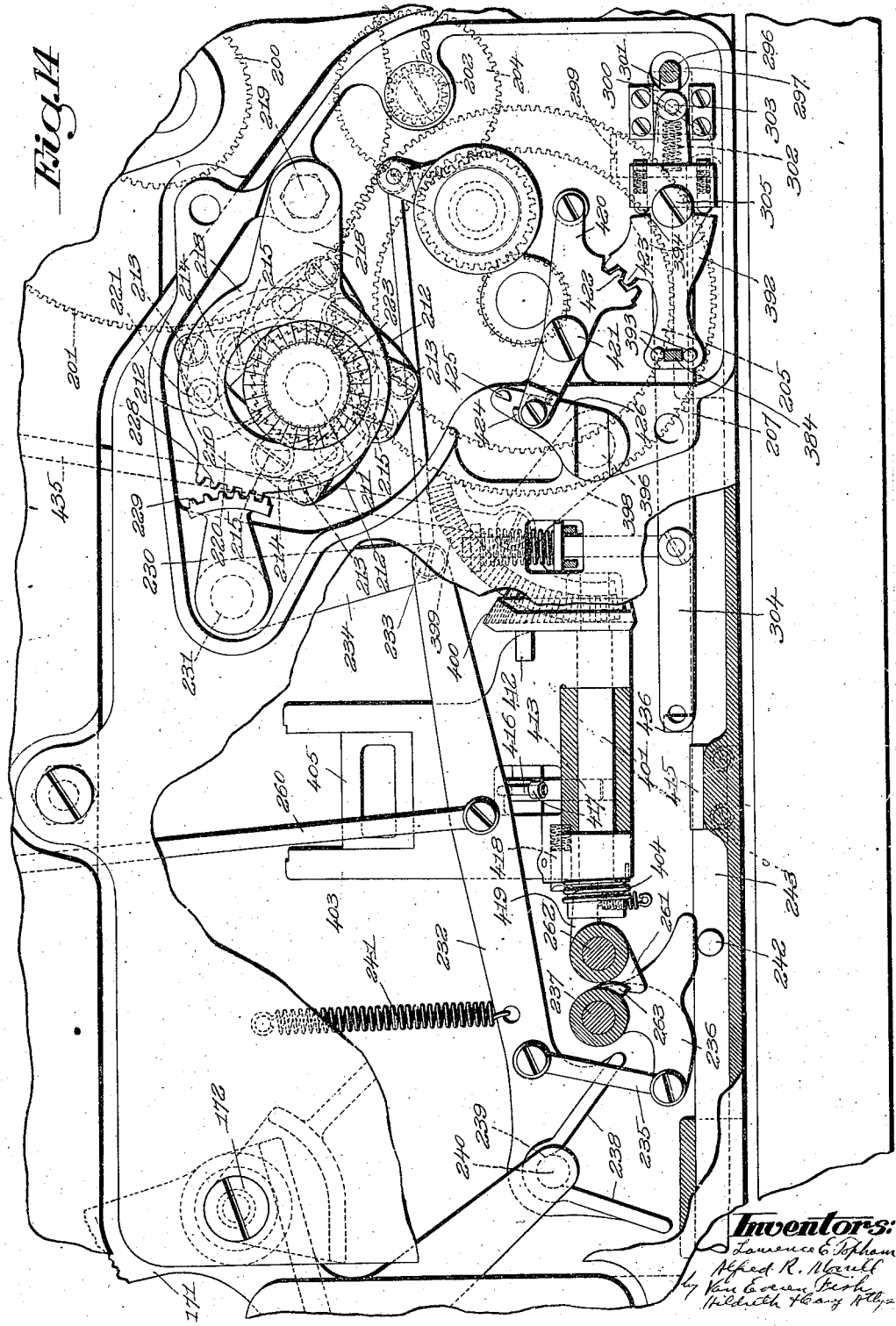

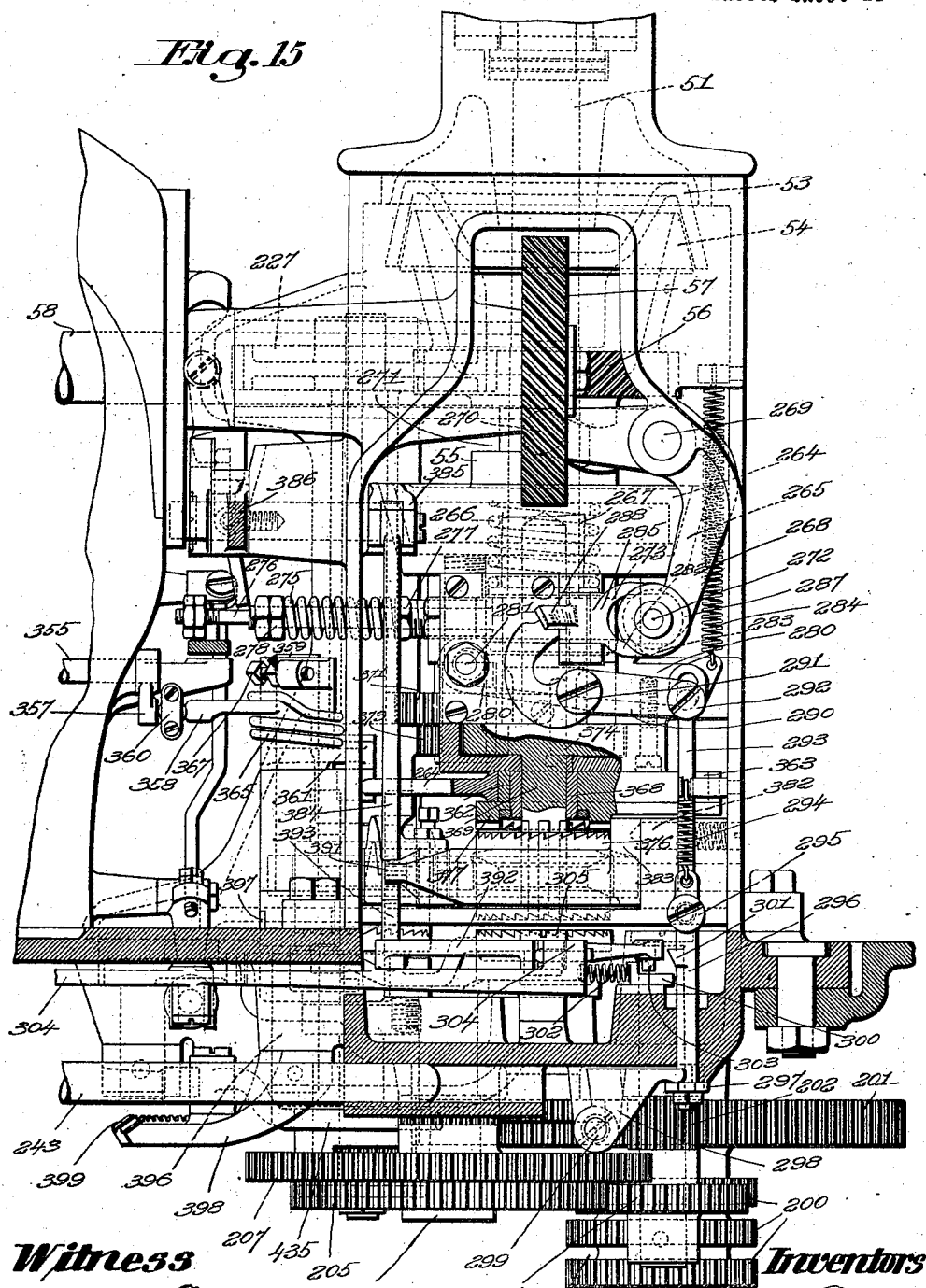

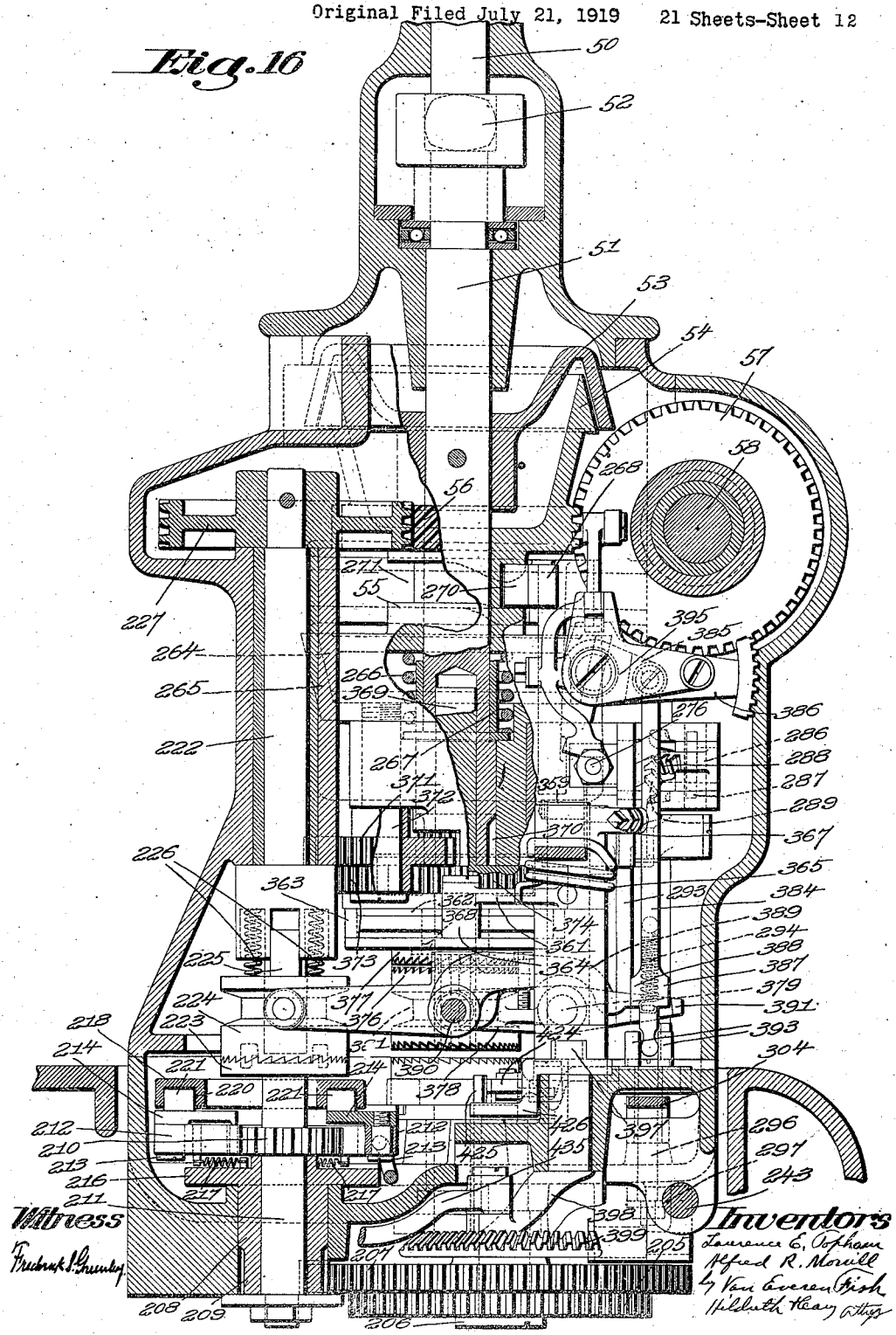

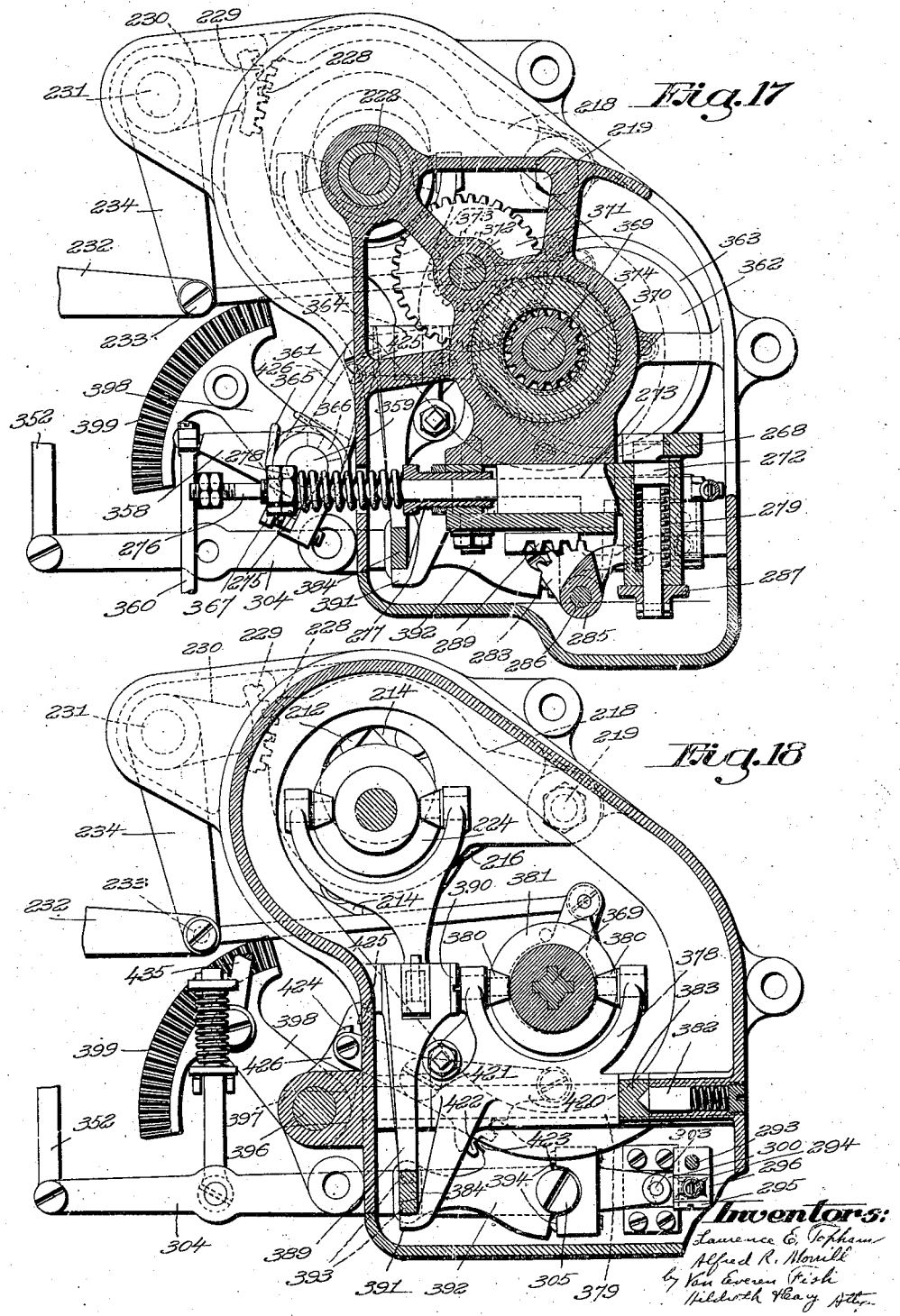

Feb. 8, 1927.　　　L. E. TOPHAM ET AL　　　1,616,719
SHOE MACHINE
Original Filed July 21, 1919　　21 Sheets-Sheet 14

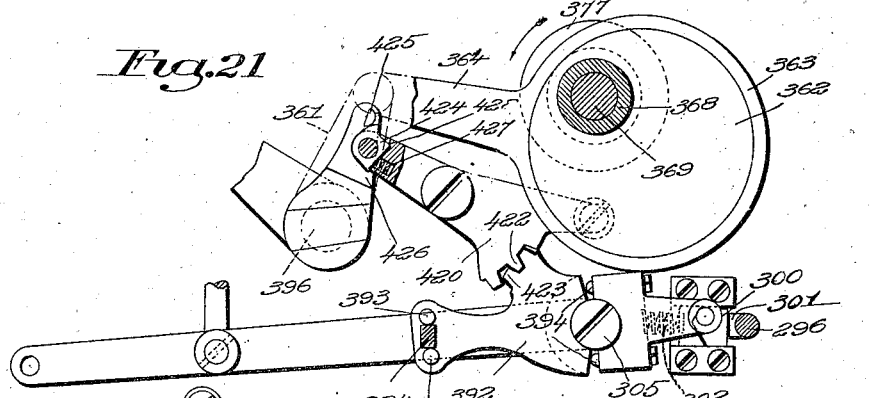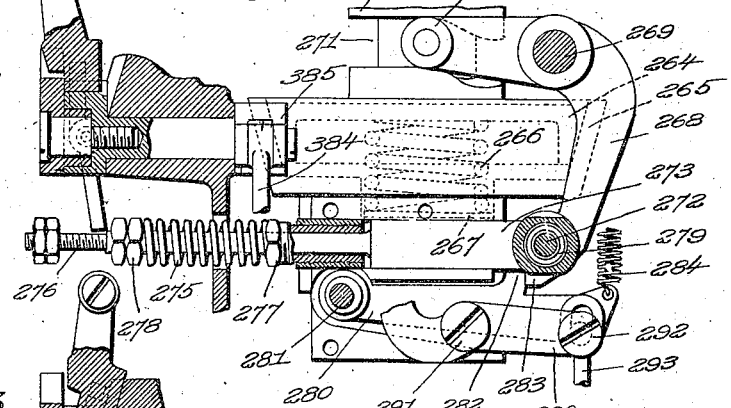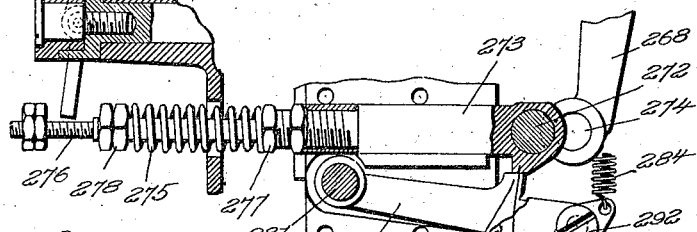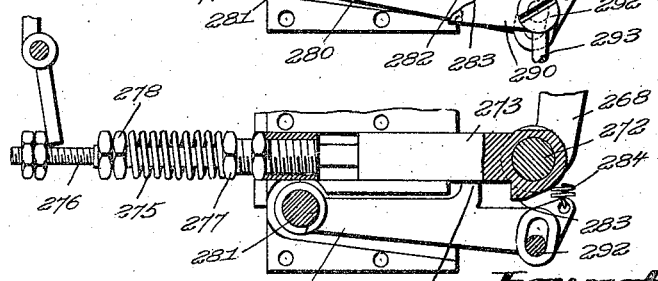

Feb. 8, 1927.
L. E. TOPHAM ET AL
SHOE MACHINE
Original Filed July 21, 1919    21 Sheets-Sheet 16
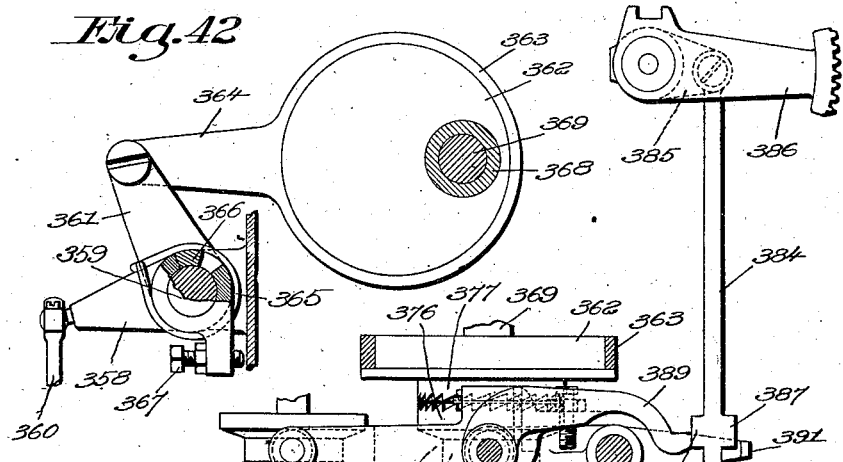
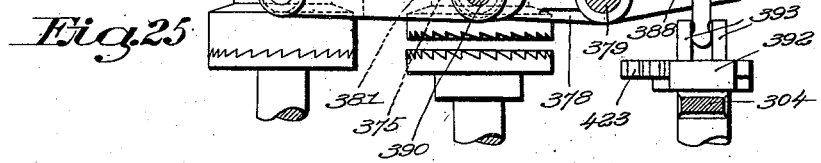
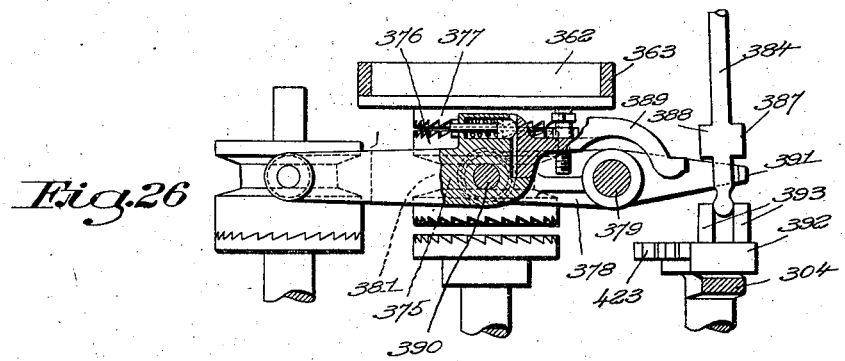
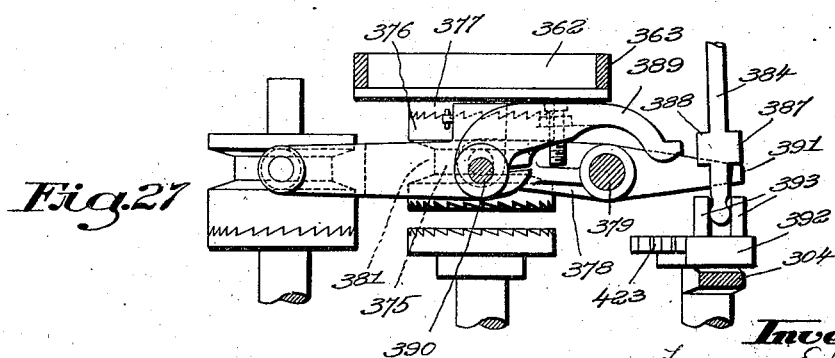

Feb. 8, 1927.

L. E. TOPHAM ET AL 1,616,719

SHOE MACHINE

Original Filed July 21, 1919  21 Sheets-Sheet 17

Witness
John J. Eclberg.

Inventors
Laurence E. Topham
Alfred R. Morrill
by Van Everen Fish
Hildreth Hay Atty.

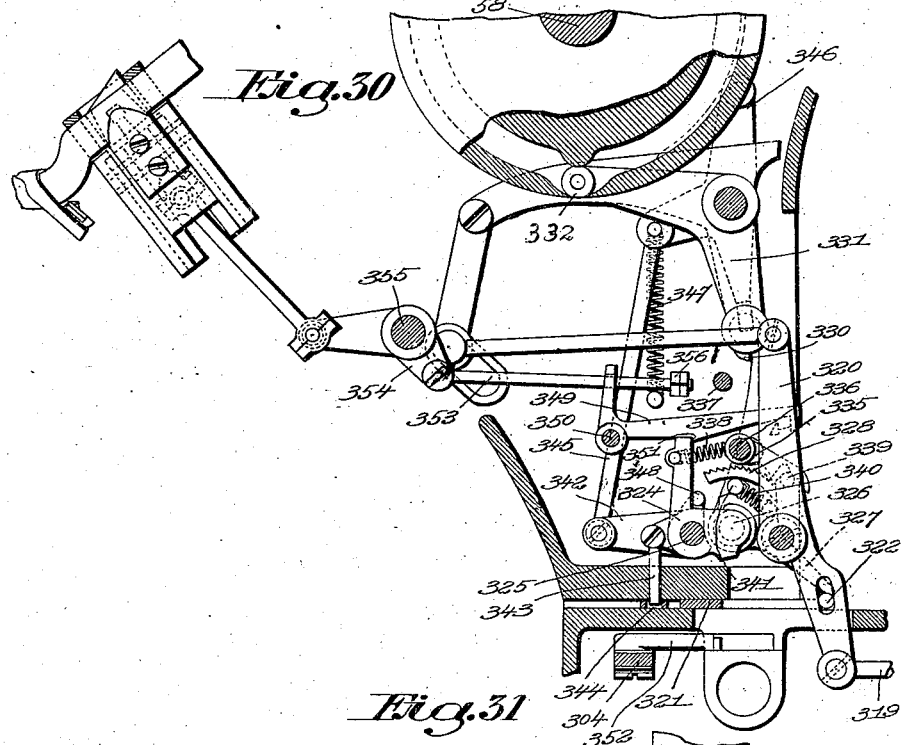
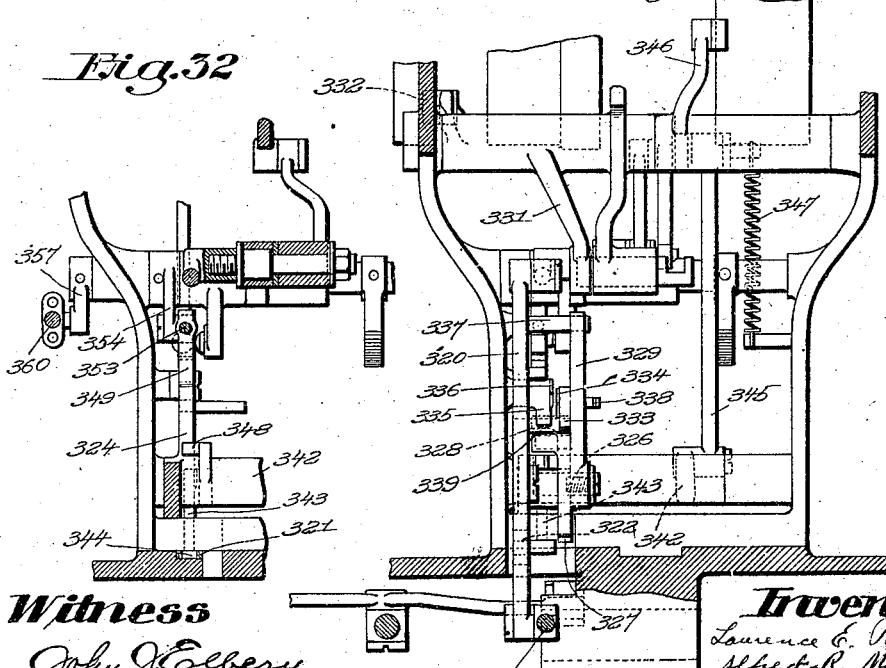

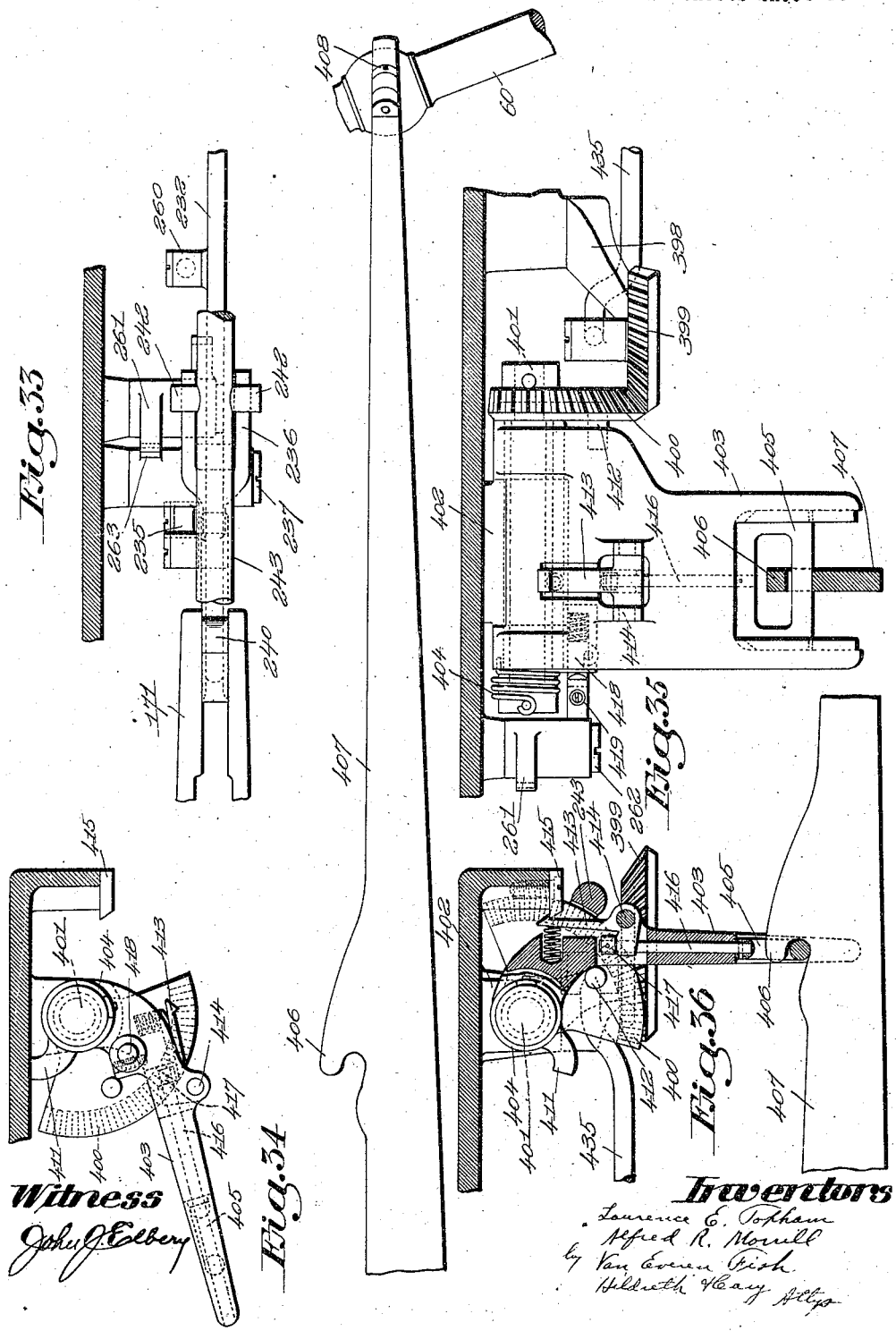

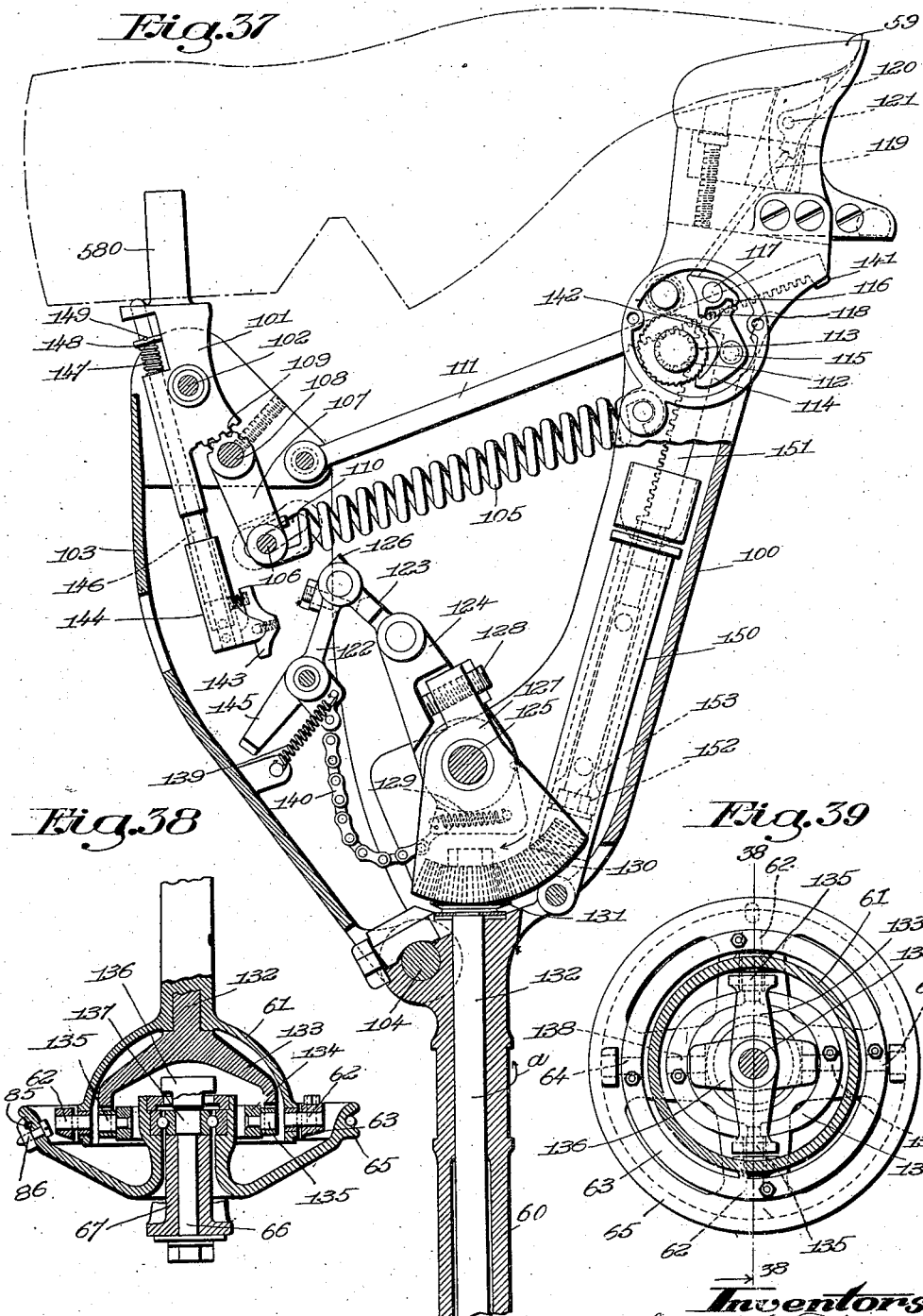

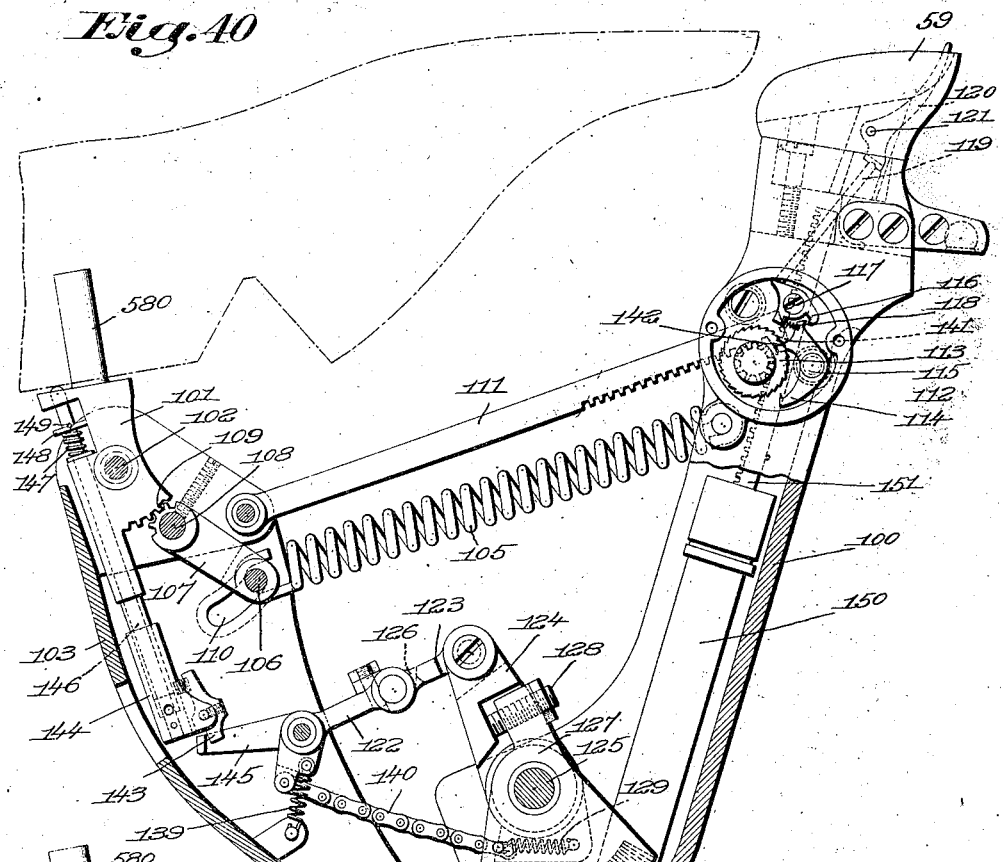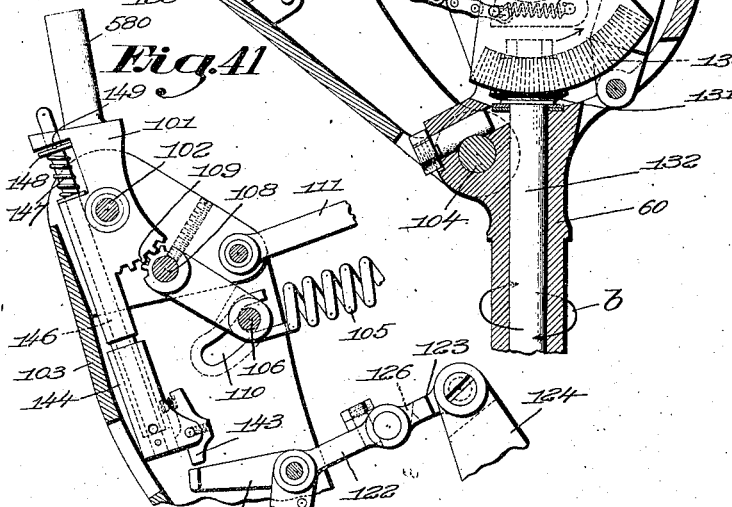

Patented Feb. 8, 1927.

1,616,719

UNITED STATES PATENT OFFICE.

LAURENCE E. TOPHAM, OF SWAMPSCOTT, AND ALFRED R. MORRILL, OF BEVERLY, MASSACHUSETTS, ASSIGNORS TO UNITED SHOE MACHINERY CORPORATION, OF PATERSON, NEW JERSEY, A CORPORATION OF NEW JERSEY.

SHOE MACHINE.

Original application filed July 21, 1919, Serial No. 312,366. Divided and this application filed December 1, 1923, Serial No. 677,961. Renewed October 20, 1926.

This invention relates to shoe machines, and more particularly to machines for operating on shoes of the type in which the shoe and the means for operating on a shoe are moved relatively to transfer the point of operation about the shoe and to change the relative positions of the shoe and the operating means to present the shoe properly to the operating means as the point of operation is transferred about the shoe, and in which the shoe is supported in operating position in the machine and all of its movements are effected and controlled by automatically acting mechanisms.

The primary object of the present invention is to improve the construction and mode of operation of automatic shoe machines and to produce a machine of this type which is simpler in construction and more efficient and reliable in operation than prior machines and upon which an operation on a shoe may be successfully performed by a comparatively unskilled operator with a minimum expenditure of labor and time.

With this and other objects in view the invention comprises various novel and improved features, constructions and combinations of parts hereinafter described and particularly pointed out in the claims, the advantages of which will be readily understood and appreciated by those skilled in the art.

The invention is illustrated in the present application as embodied in a machine for sewing welts and uppers to the insoles of welted shoes. The invention, however, is not limited to automatic shoe sewing machines but may be embodied with advantage in automatic machines for performing various operations upon shoes.

The features of the invention will be clearly understood from the accompanying drawings illustrating the invention in its preferred form, and the following detailed description of the constructions therein shown.

Figure 20:
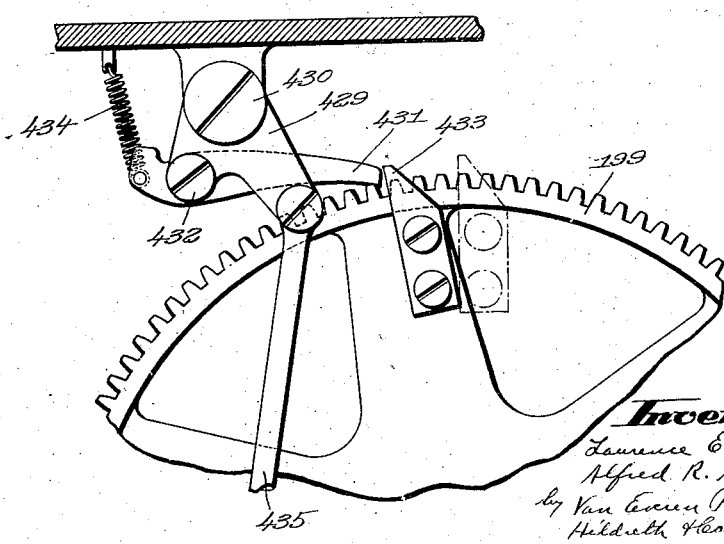
Figure 28:
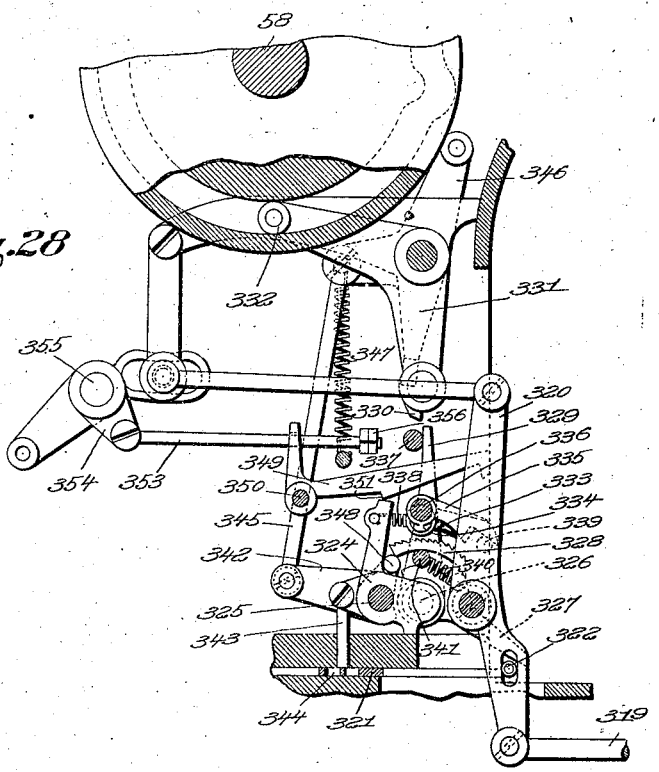
Figure 29:
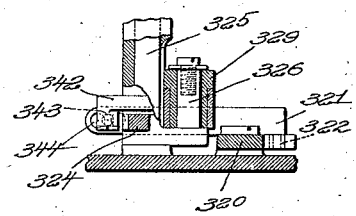

In the drawings Figure 1 is a view in front elevation of a machine embodying the invention; Fig. 2 is a view in side elevation of the machine looking from the left; Fig. 3 is a plan view of the machine; Fig. 4 is a plan view with certain parts broken away and certain parts shown in section of the portion of the machine below the sewing head; Fig. 5 is a view partly in section illustrating particularly the mechanism for supporting and actuating the jack; Fig. 6 is a detail view in side elevation illustrating particularly the mechanism for actuating the jack to impart feeding movements to the shoe; Fig. 7 is a view in side elevation of a portion of the mechanism shown in Fig. 6 and certain additional parts; Fig. 8 is a plan view partly in section illustrating the mechanism for actuating the jack to feed the shoe and certain associated parts; Fig. 9 is a detail view in front elevation illustrating certain parts of the mechanism shown in Fig. 8; Fig. 10 is a view of the mechanism illustrated in Fig. 9 showing certain parts in section; Fig. 11 is a view in side elevation partly in section of the portion of the machine below the sewing head and illustrating particularly the mechanism for supporting and actuating the jack; Fig. 12 is a view in side elevation illustrating particularly the driving mechanisms for the pattern cam shaft; Fig. 13 is a detail sectional view of certain of the parts shown in Fig. 12; Fig. 14 is a plan view partly in section illustrating a portion of the mechanism shown in Fig. 4 and certain additional parts; Fig. 15 is a view in front elevation partly in section illustrating particularly the driving connections for the various parts of the machine; Fig. 16 is a view partly in side elevation and partly in vertical section of substantially the mechanism shown in Fig. 15; Fig. 17 is a view partly in plan and partly in horizontal section illustrating certain of the parts shown in Figs. 15 and 16; Fig. 18 is a view partly in plan and partly in horizontal section illustrating a portion of the mechanism shown in Fig. 17 and certain associated parts; Fig. 19 is a detail plan view partly in section illustrating certain parts of the driving mechanism for the pattern cam shaft; Fig. 20 is a detail plan view illustrating certain parts of the mechanism for completing the rotation of the pattern cam shaft; Fig. 21 is a detail plan view partly in section illustrating certain parts of the mechanisms shown in Figs. 17 and 18; Fig. 22 is a view partly in front elevation and partly in section of a portion of the mechanism illustrated in Figs. 15 and 16; Fig. 23 is a view partly in front elevation and partly in section of a portion of the mechanism illustrated in Fig. 22 with certain of the parts in different positions; Fig. 24 is a view partly in front elevation and partly in section of a portion of the mechanism illustrated in Figs. 22 and 23 with certain of the parts in still different positions; Fig. 25 is a view in side elevation illustrating a portion of the mechanism shown in Figs. 15 and 16; Figs. 26 and 27 are views similar to Fig. 25 illustrating the parts in different positions; Fig. 28 is a view in side elevation partly in section of mechanism forming a portion of the devices for stopping the sewing mechanism at the completion of the seam; Fig. 29 is a view partly in plan and partly in section of a portion of the mechanism illustrated in Fig. 28; Fig. 30 is a view similar to Fig. 28 illustrating certain of the parts in different positions; Fig. 31 is a view in rear elevation of the mechanism shown in Fig. 28; Fig. 32 is a view in vertical section of a portion of the mechanism illustrated in Fig. 31; Fig. 33 is a detail view in front elevation illustrating certain parts of the mechanism for adjusting the speed of the pattern cam shaft; Fig. 34 is a detail view in side elevation illustrating certain parts of the mechanism for moving the jack out of operating position; Fig. 35 is a view in front elevation of the mechanism shown in Fig. 34 and certain associated parts illustrating the parts in different positions; Fig. 36 is a view in side elevation partly in section of the mechanism shown in Fig. 35 with the parts in the same positions; Fig. 37 is a view partly in front elevation and partly in vertical section of the jack; Fig. 38 is a detail sectional view illustrating the devices at the lower end of the jack spindle taken substantially on the line 38—38 of Fig. 39; Fig. 39 is a view partly in plan and partly in section illustrating the devices at the lower end of the jack spindle; Fig. 40 is a view similar to Fig. 37 illustrating certain of the parts in different positions; Fig. 41 is a detail view in vertical section illustrating a portion of the jack with certain of the parts in different positions from which they are shown in Figs. 37 and 40; and Fig. 42 is a detail plan view, partly in section, illustrating certain parts shown in Figs. 17 and 18.

The machine illustrated in the drawings is so constructed and arranged that all that is required of the operator in performing an operation on a shoe is to place the shoe on the jack, to insert the shoe in the machine and to start the machine, and to remove the shoe from the jack after the operation is completed. This machine is fully illustrated and described in pending application Ser. No. 312,366, filed July 21, 1919, of which the present application is a division. Upon placing of a shoe on the jack the shoe is automatically adjusted in a predetermined position with relation to the jack and is clamped in adjusted position. After the shoe is thus secured in adjusted position on the jack, the operator inserts the shoe in the machine in proper position for the starting of the operation, and starts the machine. After the completion of the operation on the shoe the jack is automatically moved out of operating position to disengage the shoe from the machine, and then is restored to starting position. As the jack is restored to starting position the parts of the jack are automatically actuated to unclamp the shoe and to restore the parts of the jack to their initial conditions so that after the jack comes to rest the shoe may be lifted from the jack. After the completion of the operation on the shoe the operating mechanism is stopped automatically with the parts in their initial or shoe receiving position, this position of the parts enabling the shoe to be disengaged from the operating mechanism by the movement of the jack out of operating position. Thus when the machine is finally stopped, after the completion of an operation and the shoe is removed from the jack, the parts are all in position for the reception of another shoe and for the starting of another operation.

Automatic machines for operating upon shoes heretofore produced have been provided with only one set of cams for imparting the various relative positioning movements to the operating means and the jack so that only one style of shoe could be operated upon by the machine. In changing from one style of shoe to another it has been necessary to remove the set of cams embodied in the machine from the machine and to substitute another set of cams therefor. The present machine, however, is provided with a series of sets of cams for operating on different styles of shoes which are adapted to be operatively connected interchangeably with the jack.

The machine illustrated in the drawings of the present application is a machine of the same general type as that illustrated and described in the pending application of Laurence E. Topham, Ser. No. 269,076, filed December 31, 1918. In the present machine as in the machine of the above Topham application, the sewing mechanism as a whole is fixed in position and the shoe supporting jack is movably mounted in the machine to enable the shoe to be moved laterally in the direction of feed to transfer the point of operation about the shoe, and to be moved transversely to the direction of feed to maintain the edge of the shoe bottom in the proper position with relation to the sewing mechanism transversely of the direction of feed, and to be tipped and laterally turned to position the shoe properly with relation to the sewing mechanism. The lateral movement of the shoe to transfer the point of operation about the shoe is imparted thereto by devices acting on the jack to impart movements to the jack to feed the shoe, and by the feeding devices of the sewing mechanism which directly engage the shoe and cooperate with the jack moving feeding devices. The sewing mechanism and the positioning mechanism are driven in unison during the sewing of a seam. At the completion of the seam the sewing mechanism is stopped automatically by the action of suitable stopping devices, while the positioning mechanism continues its operation to turn the jack to starting position.

The sewing mechanism of the machine illustrated in the drawing is especially constructed for sewing the inseams of welted shoes, although with certain relatively slight changes this mechanism might be fitted for sewing the inseams of turned shoes. The work engaging parts of the sewing mechanism are constructed and operated to feed the shoe continuously through the machine, these parts having substantially the same work feeding movements as the corresponding parts of the machine illustrated in the patent to Alfred R. Morrill, one of the present applicants, No. 1,397,013, granted November 15, 1921.

The driving mechanism for the cam shaft of the sewing mechanism, hereinafter referred to as the sewing cam shaft, see Figs. 15 and 16, comprises a driving shaft 50 adapted to be connected at its upper end with a suitable power shaft and a vertical counter-shaft 51 connected with the driving shaft 50 by a universal joint 52. The counter-shaft 51 carries the driving member 53 of a friction clutch, the driven member of which, indicated at 54, is carried by a flange formed on a sleeve 55 loosely mounted on the counter-shaft. The sleeve also carries a spiral gear 56 formed on the flange on said sleeve which meshes with a spiral gear 57 fixed to the sewing cam shaft 58. During the sewing operation the members 53 and 54 of the main friction driving clutch are engaged, and the sewing cam shaft is driven through the spiral gears 56 and 57 at a speed dependent upon the speed of the driving shaft 50.

The jack for supporting the lasted shoe during the operation of the machine, see Fig. 1, comprises a heel support 580 and a toe rest 59 mounted upon a spindle 60. The jack is supported in the machine in substantially the same manner as the jack of the Topham machine covered by the above application so that the various movements may be imparted to the jack required to locate a shoe supported on the jack in the proper position with relation to the sewing mechanism as the point of operation is transferred about the shoe. In the construction shown the lower end of the jack spindle is secured to a hemispherical shell or casing 61 pivoted to swing upon bearing pins 62, see Figs. 38 and 39, secured in a gimbal ring 63 having their inner ends engaging in bearings in the shell. The gimbal ring 63 in turn is pivoted to swing upon bearing pins 64 mounted in the ring and having their outer ends engaging in bearings in a wheel 65. The common axis of the bearing pins 62 is preferably located substantially at right angles to the common axis of the bearing pins 64 so that the shell 61 and the jack spindle can swing in any direction about its connections with the wheel 65. The wheel 65 is mounted to rotate on a vertical stud 66 which is secured in a casing 67 carried at the forward end of hollow supporting arms 68, see Figs. 5 and 11. This manner of mounting the jack enables the jack to be rotated freely. The rear ends of the supporting arms 68 are secured in a carrier 69 engaging between spaced projections or arms formed at the upper end of a support 70 and are pivotally mounted on said support to swing in a vertical plane by means of bearing pins 71. The support 70 embraces a second support 72 and is pivotally mounted on the latter support to swing in a plane somewhat inclined to the vertical by means of bearing pins 73. The support 72 is provided at its lower end with spaced arms and is pivotally mounted in the machine to swing forwardly and rearwardly in a vertical plane by means of bearing pins 74. With this construction the jack is movable vertically and the lower end of the jack spindle is freely movable in any direction in a horizontal plane. Furthermore, the connection between the lower end of the spindle and the devices for supporting the same will permit the upper end of the jack and the shoe to be moved horizontally in any direction independently of the lower end of the jack spindle. In order to support the jack spindle and at the same time to permit it to move vertically to accommodate itself to the necessary variations in the vertical position of the shoe, a coiled spring 75 is connected at one end with the rear end of the carrier 69 and at its other end with the support 70.

During the sewing operation the shoe is held positively to the machine at all times during each cycle of operations by the needle, welt guide and channel guide roll of the sewing mechanism. Relatively slight vertical movements to compensate for the transverse curvature of the shoe bottom are imparted to the jack and the shoe by the action of the spring 75 on the jack and by the engagement of the channel guide roll and welt guide with the shoe, these parts acting as guides for the shoe. The required tipping movements are imparted to the jack and thereby to the shoe by devices acting on the jack spindle to move the lower end of the spindle in horizontal directions forwardly, rearwardly and laterally of the machine, and the lateral turning movements are imparted to the shoe by devices acting on the jack spindle to rotate the spindle. Because of the fact that the shoe is held at all times at the point of operation by the needle, channel guide roll and welt guide, the tipping and turning movements are caused to take place about the point of operation. In the present construction the lateral tipping movements of the shoe are produced by swinging the support 72 forwardly and rearwardly, thereby imparting forward and rearward movements to the lower end of the jack spindle. The mechanism for thus swinging the support comprises a cam lever 76 pivoted on a shaft 77 and a ball ended link 78 connecting one arm of the lever with the support 72. The other arm of the cam lever 76 carries a cam roll 79 arranged to engage the periphery of a cam disk mounted on the shaft 80 which for the sake of convenience will be hereinafter termed the pattern cam shaft. This shaft is rotated through less than a complete revolution during the sewing of a shoe by mechanism hereinafter described. Longitudinal tipping movements are imparted to the jack and thereby to the shoe by swinging the support 70 about the bearing pins 73, thereby imparting movements to the lower end of the jack spindle laterally of the machine. The required swinging movements are imparted to the support 70 by means of a cam lever 81 pivoted on the shaft 77 and a link 82 connecting one arm of the cam lever with an arm 83 on the support. The other arm of the cam lever carries a cam roll 84 arranged to engage the periphery of a cam disk mounted on the correcting cam shaft 80. The lateral turning movements of the jack and the shoe are produced by imparting turning movements to the wheel 65 about the stud 66. The required turning movements are imparted to the wheel by means of a cable 85 passing about the wheel within a groove in the periphery thereof and secured from slipping about the wheel by means of a clamping plate 86. The part of the cable leading rearwardly from the right side of the wheel 65 extends about a pulley 87 mounted upon a stud 88 secured in the carrier 69, thence extends to the right about a pulley 89 mounted to rotate on a stud 90, and is secured at its end to said pulley. The part of the cable 85 leading rearwardly from the left side of the wheel 65 extends about a pulley 91 mounted on a stud 92 secured in the support 69, thence extends toward the rear of the machine and passes over a pulley 93 mounted on an arm of a stationary carrier 94. To the end of this part of the cable is secured a weight 95 which operates to keep the cable taut at all times. The required rotative movements of the wheel 65 are produced and controlled by rotative movements imparted to the pulley 89. The mechanism for rotating the pulley comprises a gear 96 secured to the pulley and a cam lever 97 pivoted on the shaft 77, one arm of which carries a gear segment 98 meshing with the gear 96. The other arm of the cam lever carries a cam roll 99 arranged to engage the periphery of a cam disk mounted on the correcting cam shaft 80.

It will be noted from an inspection of Fig. 5 that the pulley 87 is arranged to the rear of the pulley 91 or intermediate the latter pulley and the axis upon which the carrier 69 is arranged to swing laterally of the machine. With the parts arranged as above described, the weight 95 tends to rotate the pulley 89 in a counter-clockwise direction and tends to swing the carrier 69 to the left and to move the carrier rearwardly. The weight thus acts to maintain the cam rolls carried by the cam levers 76, 81 and 97 constantly in engagement with their respective cam disks and to eliminate back lash in the connections between said levers and the jack.

The jack of the present invention has the same construction, arrangement and mode of operation of parts as the jack illustrated and described in the Topham application referred to above. The jack illustrated in the drawing (see Figs. 37 to 41, inclusive) is constructed and arranged so that upon the placing of the shoe on the jack the shoe is automatically located in a predetermined and unvarying position lengthwise of the jack regardless of the size of the shoe placed on the jack and is then securely clamped in adjusted position, and that at the completion of the sewing operation the shoe is unclamped and the parts of the jack are restored to their initial positions ready for the application of another shoe to the jack. The shoe is gaged with relation to the jack from the forward point in the bulge in the toe portion of the upper of the shoe. The toe rest 59 is concave in cross section so that it will center the toe of the shoe relative to the jack and is mounted on the upper end of an arm 100 on the jack frame. The heel support 580 consists of a last pin for insertion in the last pin hole in the last and is mounted upon a lever 101 pivoted on a stud 102 carried at the upper end of a swinging arm 103. The heel support carrying arm 103 is pivoted at its lower end to the central portion of the jack frame by means of a stud 104 so that the arm may be swung toward and from the toe rest supporting arm 100 to carry the last pin toward and from the toe rest. Before a shoe is placed on the jack the arm 103 is located in a position relatively remote from the arm 100 and upon the placing of the shoe on the last pin 580 is swung toward the arm 100 to adjust the shoe in a predetermined position longitudinally of the jack. The arm 103 is acted upon by a comparatively heavy coiled spring 105 secured at one end to the arm 100 and at its other end to a pin 106 mounted in the outer end of a lever 107 pivoted upon a stud 108 secured in the arm 103. Upon the hub of the lever 107 is formed a series of gear teeth meshing with the teeth of a gear segment 109 formed on the last pin lever 101. The opposite ends of the pin 106 are engaged in slots 110 in the arm 103 which limit the movement of the lever 107. When a shoe is applied to the jack the arm 103 is held substantially in the position shown in Fig. 40 relative to the arm 100 with the last pin located so that when the shoe is applied thereto the toe of the shoe will be out of engagement with the toe rest as shown in said figure, the coiled spring 105 then being distended and the pin 106 held in engagement with the inner ends of the slots 110. Upon the placing of the shoe on the last pin the arm 103 is released so that it is free to move under the action of the coiled spring 105. By the action of said coiled spring the arm 103 is swung toward the arm 100 thereby carrying the toe of the shoe into engagement with the surface of the toe rest and sliding the same along the toe rest toward the forward end thereof. The surface of the toe rest with which the toe of the shoe is thus brought into contact is inclined upwardly with relation to the arc about which the toe of the shoe is swung, so that as the toe of the shoe slides along this surface it is lifted thereby swinging the last pin lever 101 about the stud 102 and also swinging the lever 107 about the stud 108 in a direction to carry the pin 106 away from the inner ends of the slots 110. Thus when the shoe is adjusted in the proper position on the jack and the swinging movement of the arm 103 ceases, the parts described will have assumed substantially the positions shown in Figure 37, the coiled spring 105 not only acting on the arm 103 to maintain the shoe in its adjusted position longitudinally of the jack but also through its action on the lever 107 tending to tilt the lever 101 in a direction to depress the toe of the shoe and thereby clamp the shoe firmly on the jack.

In order that the shoe may be located accurately in a predetermined and definite position longitudinally of the jack, mechanism is provided for arresting the swinging movement of the heel support carrying arm 103 toward the arm 100 when the forward point of the bulge in the toe portion of the upper reaches a definite predetermined position longitudinally of the jack. The mechanism for thus arresting the movement of the arm 103 comprises a bar 111 pivotally connected at one end with the arm 103 and having its other end arranged to pass through an opening in the toe rest supporting arm 100. The bar 111 is formed on its lower side with a series of rack teeth meshing with the teeth of a pinion 112 rotatably mounted in the arm 100. To the pinion 112 is secured a ratchet wheel 113, and a pawl 114 pivoted at 115 on the arm 100 is arranged to engage the teeth of the ratchet wheel. When the arm 103 is swung toward the arm 100 to adjust the shoe longitudinally of the jack the ratchet wheel 113 is rotated in a clockwise direction, Fig. 40, by the longitudinal movement of the rack bar 111. The pawl 114 is normally held out of engagement with the ratchet wheel during the movement of the arm 103 toward the arm 100 by means of a latch 116 pivoted at 117 on the arm 100 and formed with a projection arranged to engage the tail of the pawl. The latch and the pawl are both acted upon by a coiled spring 118 which tends to move the latch into position to engage the pawl and also to move the pawl into engagement with the ratchet wheel 113. The latch is actuated to release the pawl by means of a rod 119 mounted for longitudinal movement in guides in the arm 100 with its lower end engaging an arm on the latch. The upper end of the rod 119 is engaged by a lateral projection formed on the lower end of a feeler lever 120 pivoted at 121 in a central slot in the toe rest. The upper end of the feeler lever 120 is located in position to be engaged by the bulge in the toe portion of the upper of a shoe applied to the jack. As the shoe is moved forwardly on the jack by the swinging movement of the heel support carrying arm 103 under the influence of the coiled spring 105 the bulge at the toe portion of the upper of the shoe engages the upper end of the feeler lever 120 thereby swinging the feeler lever on its axis and actuating the rod 119 and the latch 116 to disengage the latch from the pawl 114. Upon its release by the latch the pawl is engaged with the ratchet wheel 113 thereby arresting the rotation of the ratchet wheel and the swinging movement of the arm 103. The swinging movement of the arm 103 to adjust the shoe longitudinally on the jack is thus positively arrested when the forward point in the bulge in the toe portion of the upper of the shoe reaches a predetermined position longitudinally of the jack. The shoe after its adjustment in the proper predetermined position is held securely clamped on the jack by the action of the coiled spring 105 on the lever 107 as above explained.

The mechanism for controlling the swinging movements of the heel support carrying arm 103 comprises a toggle lever consisting of two pivotally connected links 122 and 123, of which the link 122 is pivotally connected with the arm 103 and the link 123 is pivotally connected with a lever 124 pivoted on a stud 125 carried by the central portion of the jack frame. The relative angular movement of the members of the toggle lever in a direction to straighten the toggle is limited by means of a projection 126 formed on the member 122 of the toggle lever arranged to engage an abutment or contact face on the member 123. A toggle actuating and controlling lever 127 is pivoted on the stud 125 by the side of the lever 124 and carries an abutment screw 128 for engagement with a shoulder formed on the lever 124. The levers 124 and 127 are connected by means of a coiled spring 129 which normally maintains the lever 124 in position relative to the lever 127 with the shoulder formed thereon in contact with the abutment screw 128. The lever 127 carries a bevel gear segment 130 meshing with a bevel gear 131 secured to the upper end of a shaft 132 mounted in bearings in the jack spindle 60. Upon the lower end of the shaft 132 is formed a yoke 133, see Figs. 38 and 39, which embraces a gimbal ring 134 and is pivotally connected with the ring by means of bearing pins 135 secured in the ring and engaging in bearings in the arms of the yoke. The ring 134 embraces a yoke 136 mounted on the upper end of a stud 137 mounted within and secured to the stud 66 and is pivotally connected with the latter yoke by means of bearing pins 138 secured in the ring and engaging in bearings in the arms of the yoke. The shaft 132 through its connection with the stud 137 is held from rotary movement with the jack spindle but is free to swing in a direction relative to the stud in accordance with the swinging movements of the spindle. When the shoe is placed on the jack the toggle lever 122—123 is straightened and the toggle actuating and controlling lever 127 and the intermediate lever 124 are held in position through the engagement of the gear segment 130 with the bevel gear 131 to maintain the heel support carrying arm 103 in a position remote from the toe rest supporting arm 100 as shown in Fig. 40 against the tension of the spring 105. Upon the placing of a shoe on the jack the toggle lever is broken allowing the spring 105 to actuate the arm 103 to adjust the shoe in a predetermined position longitudinally of the jack and to clamp the same in position as shown in Fig. 37. The jack is turned through substantially half a revolution in the direction of the arrow $a$, Fig. 37, during the sewing of a seam. During this turning movement of the jack the toggle actuating and controlling lever 127 is swung on the stud 125 in the direction of the arrow applied thereto in said figure and the intermediate lever 124 is swung therewith until at the completion of the sewing of the seam the toggle lever is straightened. The jack is turned in the opposite direction or in the direction of the arrow $b$, Fig. 40, through substantially half a revolution by the rotation of the pattern cam shaft independently of the sewing cam shaft to bring the jack to its initial or starting position, and the lever 127 is swung on the stud 125 in the direction of the arrow applied thereto in Fig. 40. The toggle lever 122—123 is then in a straightened condition and is moved longitudinally from the lever 127 through the lever 124 to swing the arm 103 away from the arm 100 into the position shown in Fig. 40. The shoe is thus unclamped from the jack and may be removed from the jack merely by lifting the shoe from the last pin 580.

To take up lost motion and assist in straightening the toggle lever at the completion of the turning movement of the jack produced during the sewing of the seam a coiled spring 139 is attached at one end to the arm 103 and at its other end to a projection formed on the member 122 of the toggle lever. The yielding connection between the intermediate lever 124 and the toggle actuating and controlling lever 127 will take care of any additional movement or overthrow of the lever 127 at the completion of the seam after the toggle lever is straightened.

During the sewing of the seam along the shank of the shoe on the side of the shoe first sewn the jack is turned to a certain degree in the direction of the arrow $b$, Fig. 40. If the operator should start the machine while the toggle lever is straightened the movement of the lever 127 in the direction of the arrow, Fig. 40, which would be produced by this rotary movement of the jack would be liable to result in breakage of certain of the parts. In order to break the toggle lever when this rotary movement of the jack occurs, in case the machine is started with the toggle lever straightened, a chain 140 is attached at one end to the projection on the member 122 of the toggle lever and at its other end to the lever 124.

In order to disengage the pawl 114 from the ratchet wheel 113 and to reset the pawl in position to be engaged and held by the latch 116, the rack bar 111 is formed with a projection 141 at its outer end arranged to engage a laterally projecting arm 142 formed on the pawl. As the heel support carrying arm 103 is swung from the position shown in Fig. 37 to the position shown in Fig. 40, and the bar 111 is thus moved longitudinally to the left to the position shown in the latter figure, the projection 141 on the bar engages the arm 142 on the pawl and moves the pawl to disengage the same from the ratchet wheel 113 and to carry the tail thereof within the cooperating projection on the latch 116 as shown in Fig. 40. The pawl is held in the position shown in Fig. 40 until the arm 103 is released and starts to swing toward the toe rest supporting arm 100 under the influence of the coiled spring 105 when the projection 141 on the bar 111 is disengaged from the arm 142 on the pawl by the longitudinal movement of the bar to the right. The pawl is then caught by the latch and held until the latch is disengaged from the pawl by the movement of the feeler lever 120 produced by the engagement of the shoe therewith.

The devices for breaking the toggle lever 122—123 upon the placing of the shoe on the jack comprise a spring pressed dog 143 pivoted upon a vertically movable block 144 and arranged to engage the laterally bent end of an arm 145 formed on the member 122 of the toggle lever. The block 144 is secured to the lower end of a rod 146 mounted for longitudinal movement in guides in the lever 101. The rod 146 is acted upon by a coiled spring 147 surrounding the rod within a recess in the lever 101 and interposed between a washer resting on the lower face of the recess and a collar 148 mounted on the rod and held from longitudinal movement thereon by a pin 149. This pin through its engagement with the upper face of the recess in the lever 101 limits the upward movement of the rod. The parts are constructed and arranged so that when the rod 146 is in elevated position the upper end of the rod projects some distance above the body of the lever 101 alongside the last pin 580 and the dog 143 is located above the laterally bent end of the arm 145 in position to engage the same as shown in Fig. 41. Fig. 41 shows the condition of the parts before a shoe is applied to the jack. Upon the application of a shoe to the last pin and the seating of the last pin in the last pin hole in the last, the last pin engages the upper end of the rod 146 and depresses the same. During the downward movement of the rod the dog 143 engages the end of the arm 145 and swings the same downwardly, thereby breaking the toggle lever 122—123 and allowing the arm 103 to be actuated by the spring 105 to adjust the shoe longitudinally of the jack and to clamp the same to the jack. As the toggle lever is straightened by the turning movement imparted to the jack during the sewing of a seam, the laterally bent end of the arm 145 is swung upwardly to a position outside of the lower end of the dog 143. As the arm 103 is swung away from the arm 100 by the turning movement imparted to the jack to bring the same to its initial or starting position, the end of the arm 145 engages the lower end of the dog 143 and swings the same slightly inwardly. Upon the removal of the shoe from the last pin the rod 146 is elevated by the action of the spring 147 and the lower end of the dog 143 is swung outwardly by the action of its spring over the end of the arm 145 as shown in Fig. 41. The parts of the jack are thus restored to their initial position ready for the reception of another shoe.

The movement of the heel support carrying arm 103 under the influence of the coiled spring 105 upon the release of the arm by the toggle lever 122—123 if unrestrained is liable to result in breakage of certain of the parts. A dash pot mechanism is therefore provided for retarding the movement of the arm. This dash pot mechanism is adapted to be fluid controlled and briefly described comprises a cylinder 150 secured at its lower end to the jack frame, a longitudinally movable bar 151 having rack teeth formed at its upper end which are held in mesh with the pinion 112, a piston 152 secured to the bar 151, and a valve 153 mounted in the piston. This valve is constructed to allow the controlling fluid to pass freely from above the piston to the space below the same as the piston moves upwardly in the cylinder and to retard the passage of the fluid from below the piston as the piston is moved downwardly in the cylinder. The manner in which this dash pot mechanism operates to retard the movement of the arm 103 will be obvious without further description.

The mechanism for actuating the jack to impart feeding movements to the shoe, see Figs. 3, 6, 7 and 8, comprises a lever 154, which may for convenience be termed the feeding lever, pivoted by means of a stud 155 upon the frame of the machine, and a bar connecting said lever with the forward or toe end of the jack. The lever 154 is made up of the stud 155 and upper and lower arms secured respectively at their rear ends to the upper and lower ends of the stud, as shown in Fig. 6. A bar 156 is connected at one end by a universal joint 157 with the forward end of the upper arm of the lever 154, and at its other end by a universal joint 158 with the forward end of the jack. During the sewing operation the feeding lever 154 is swung toward the left to actuate the jack to advance the marginal portion of the shoe at a substantially uniform rate past the stitch forming devices, or to feed the shoe in conformity with the feeding movements normally imparted to the shoe by the shoe engaging feeding devices of the sewing mechanism. The mechanism for actuating the lever 154 in this manner comprises links 159 and 160 pivotally connected by a stud 161 of which the link 159 is pivotally connected with the lever 154 by a stud 162, and the link 160 is pivotally connected at 163 with the end of an arm 164 pivoted on a stud 165. The arm 164 is swung about the stud 165 during the sewing operation by means of a cam lever 166, one arm of which is connected with said arm by means of a link 167. The other arm of the cam lever carries a cam roll 168 arranged to engage the periphery of a cam disk mounted on the pattern cam shaft 80. The path of the connection between the links 159 and 160 during the swinging movements of the arm 164 is controlled by a controlling arm 169 pivotally connected at its forward end by the stud 161 with said links. The controlling arm is pivoted at its rear end upon a stud 170 carried by a lever 171 which, for convenience, may be hereinafter termed the fulcrum carrying lever. As clearly shown in Figures 6 and 7, the body of the lever 171 is made in the form of a rectangular frame, the arm 169 engaging between the upper and lower sides of said frame. The lever 171 is pivoted by means of bearing pins 172 upon the frame of the machine. During the sewing operation the fulcrum carrying lever 171 is locked in position and the links 159 and 160 are actuated through the connection described from the cam lever 166 to actuate the feeding lever 154, the controlling arm 169 and the connection between the links swinging about the stud 170 during the movement of the links.

The center of the pivotal connection between the controlling arm 169 and the links 159 and 160 is located the same distance from the fulcrum 170 as the axis of the fulcrum carrying lever 171 so that the center of said pivotal connection is brought into alignment with the axis of said lever as the controlling arm is swung about its fulcrum during the sewing of a seam. The parts are constructed and arranged so that at the beginning of the sewing operation the controlling arm 169 is located at the right of the fulcrum carrying lever 171, that the swinging movement of the controlling arm carries the center of the pivotal connection between the links 159 and 160 and said arm into alignment with the axis of the fulcrum carrying lever 171 when the toe of the shoe is reached, and that at the completion of the seam the controlling arm 169 is swung into a position at the left of the fulcrum carrying lever, the positions of said controlling arm at the beginning and at the end of the sewing operation having a symmetrical relation to the position of said lever.

A cable 173, see Figs. 1 and 4, is fastened at one end to the stud 162 and extends therefrom about a pulley 163 mounted to turn upon the end of the lower bearing pin 172, thence about a pulley 174 mounted on the fulcrum carrying lever 171, and over a pulley 175 mounted on an arm on a stationary bracket 176 and a weight 177 is suspended at the other end of the cable. The weight 177 through its action on the cable 173 tends to swing the feeding lever 154 to the right and the rear end of the fulcrum carrying lever 171 to the left and thus tends to swing the cam lever 166 rearwardly. The weight will thus act on the cam lever to maintain the cam roll constantly in contact with the periphery of the corresponding cam disk, and will eliminate lost motion or back lash between the parts of the mechanism through which the feeding lever is actuated and also between the connections intermediate the fulcrum carrying lever 171 and the feeding lever.

In the present machine as above stated the feeding lever 154 is actuated to feed the shoe to impart a continuous feeding movement to the shoe corresponding with the feeding movement which is normally imparted to the shoe by the shoe engaging feeding devices. With a jack actuating feeding mechanism of the above construction the imparting of the proper movement to the jack to feed a shoe of one size requires that a movement of greater amplitude or extent be imparted to the feeding lever 154 than is required in feeding a shoe of smaller size. To enable this mechanism for actuating the jack to feed the shoe to impart the proper feeding movements to the jack to feed shoes of different sizes, the movement imparted from the arm 164 through the links 159 and 160 to the feeding lever is adjusted in accordance with the size of the shoe placed in the machine. The mounting of the fulcrum of the controlling arm 169 upon the lever 171 enables this fulcrum to be shifted to vary the path of connection between the links 159 and 160. In changing from one size of shoe to a smaller size, the fulcrum carrying lever is swung to the left about its axis to adjust the fulcrum of the controlling arm 169, while in changing from one size to a larger size, the fulcrum carrying lever is swung to the right to adjust the fulcrum of the controlling arm. The shifting of the fulcrum of the controlling arm to the left will increase the amount of the movement of the arm 164 absorbed in the relative movement of the links 159 and 160 and will cause a reduction in the amplitude of movement of the feeding lever 154, while in a corresponding manner the shifting of the fulcrum of the controlling arm 169 to the right will reduce the amount of the movement of the arm 164 absorbed in the relative movement of the links 159 and 160 and will cause an increase in the amplitude of movement of the feeding lever.

The fulcrum of the controlling arm 169 is located in the proper position for the size of the shoe to be sewn by the placing of the shoe in the machine in correct position for the starting of the seam. At the time when the shoe is placed in the machine, the fulcrum carrying lever 171 is unlocked so that it may be adjusted about its axis. When a shoe is placed in the machine in correct position for the starting of the seam, the feeding lever 154 will be adjusted through the connection between said lever and the jack in a position depending upon the size of the shoe. The adjustment of the feeding lever thus produced will effect the proper adjustment of the fulcrum of the controlling arm 169. Thus in changing from one size of shoe to a smaller size the feeding lever 154 will be swung to the left upon the placing of the shoe in the machine in position to be sewn, the connection between the links 159 and 160 will be swung rearwardly about the pivotal connection between the link 160 and arm 164, and the fulcrum carrying lever will be swung to the left by the action of the controlling arm 169. In a corresponding manner in changing from one size of shoe to a larger size, the feeding lever 154 will be swung to the right upon the placing of the shoe in the machine, the connection between the links 159 and 160 will be swung forwardly about the pivotal connection between the link 160 and the arm 164, and the fulcrum carrying lever 171 will be swung to the right by the action of the controlling arm 169.

To enable different styles of shoes to be sewn upon the machine, a series of sets of cam disks for actuating the cam levers 166, 97, 76 and 81 are mounted on the pattern cam shaft 80 and are arranged so that they may be interchangeably located in position to be engaged by the cam rolls carried by the respective cam levers. In the construction illustrated, see Fig. 11, the pattern cam shaft carries seven sets of cam disks. The cam disks for actuating the several cam levers, 166, 97, 76 and 81 are indicated in the drawing respectively at 178, 179, 180 and 181 and each set referred to is of course made up of four disks, one from each of these groups. To enable the cam disks of any one of the sets to be located in operative positions with relation to the several cam levers, the pattern cam shaft 80 is mounted so that it may be shifted axially, and manually operable means is provided for shifting the same. In the construction illustrated the pattern cam shaft is centrally bored and rotates on a vertical supporting shaft 182. The upper end of the shaft 182 is mounted to turn in a bearing 183 in the frame, and has an arm 184, see Figs. 3 and 12, secured thereto and engaging the upper end of said bearing to support the shaft. The shaft 182 is formed at its lower end with screw threads 185 of relatively steep pitch and is threaded into a sleeve mounted to slide vertically in a bearing 187 in the frame and held from turning movement by a key 188. The pattern cam shaft is supported by the sleeve 186 through a ball bearing 189 interposed between the lower end of the shaft and the upper end of the sleeve. With this construction the pattern cam shaft may be adjusted axially to locate any one of the sets of cam disks in operative position with relation to the cam levers by a suitable rotary adjustment of the shaft 182, which is adapted to be rotated manually by swinging the arm 184. In order to hold the shaft 182 in position a spring pressed plunger 190 is mounted in the outer end of the arm 184 and is arranged to engage in an opening 191 in the frame of the machine. To the upper end of the plunger is secured a sleeve 192, see Fig. 13, by which the plunger may be manually retracted from the opening before adjusting the shaft 182. The threads on the shaft are so constructed that the pattern cam shaft is shifted axially to carry one set of cam disks out of operating position and to locate the next succeeding set in operative position with relation to the cam levers by a single complete rotation of the shaft 182.

In order that the cam levers 166, 97, 76 and 81 and the cam rolls carried thereby may not interfere with the shifting of the cam disks carried by the pattern cam shaft, mechanism is provided for swinging said cam levers in a direction to carry the cam roll supporting arms thereof away from the cam disks prior to the shifting of the cam disks. In the construction shown, see Figs. 1 and 11, a collar 193 is secured to the shaft 77 intermediate the hub of the cam lever 166 and the hub of the cam lever 97, and a similar collar 194 is secured to the shaft 77 intermediate the hub of the cam lever 76 and the hub of the cam lever 81. Each of these collars is provided with shoulders arranged to engage opposed shoulders formed on the hubs of the respective cam levers. The shoulders on the collars and on the hubs of the cam levers are arranged so that when the shaft 77 is in its normal position, the cam levers can swing freely about the shaft as required in imparting the various movements to the jack during the sewing operation. Before the pattern cam shaft is moved axially to shift the cam disks, the shaft 77 is swung in a counter-clockwise direction, Fig. 3, from its normal position. During this turning movement of the shaft the shoulders on the collars 193 and 194 engage the opposed shoulders on the hubs of the cam levers, and the cam levers are swung with the shaft, thereby carrying the cam roll supporting arms of the cam levers away from the cam disks. An operating arm 195 is secured to the upper end of the shaft 77 and a spring pressed plunger 196 is mounted in the end of said arm and is arranged to engage in an opening 197 in the frame of the machine to hold the arm and the shaft 77 in normal position. A sleeve 198 similar to the sleeve 192 is secured to the upper end of the plunger 196. In changing from one style of shoe to another, the operator before shifting the pattern cam disks grasps the sleeve 198, disengages the plunger 196 from the opening 197 in the frame, and swings the arm 195 in a counter-clockwise direction, thereby turning the shaft 77 to carry the cam roll supporting arms of the cam levers away from the cam disks. He then grasps the sleeve 192, disengages the plunger 190 from the opening 191 in the frame and swings the arm 184 in one direction or the other through one or more complete revolutions to bring the desired set of cam disks into operating position. He then swings the arm 195 back to its normal position to restore the cam levers to operative positions with relation to the cam disks of this set. The arm 184 is formed with a slot in which the plunger 196 engages when the arms 184 and 195 are in their normal positions as shown in Fig. 3. The arm 184 is thus locked in position until the arm 195 is swung in a counter-clockwise direction to disengage the plunger 196 from the slot in the arm 184. This construction makes it practically certain that the operator will not attempt to shift the cam disks while the cam levers are in operative positions.

The adjustment of the fulcrum of the controlling arm 169 will adjust or time the action of the jack actuating feeding mechanism with relation to the action of the mechanism for tipping and turning the jack to present the shoe properly to the sewing devices. In order that the jack actuating feeding mechanism may operate to feed the shoe always at the same rate that the shoe is normally fed by the shoe engaging feeding devices regardless of the size of the shoe, mechanism is provided for adjusting the speed of the pattern cam shaft in accordance with the size of the shoe to be sewn. The speed of the pattern cam shaft is adjusted in accordance with the size of the shoe upon the depression of the treadle to start the machine by the action of mechanism controlled from the fulcrum carrying lever 171.

The mechanism for driving the pattern cam shaft, see Figs. 4, 12, 15 and 16, comprises a gear 199 secured to the upper end of said shaft and a series of substantially duplicate gears 200 journaled on the shaft 77 and arranged to mesh with the gears 199 to drive the same. The gears 200 are all secured together and the gear 199 is shifted from engagement with one of said gears into engagement with another of the same as the pattern cam shaft is moved axially to shift the pattern cam disks. To the gears 200 is secured a gear 201 meshing with and driven by a gear 202 secured to a shaft 203 journaled in a bearing in the frame of the machine. To the gear 202 is secured a gear 204 and the gears 202 and 204 are driven by a gear 205 secured to a shaft 206 journaled in the frame of the machine, said gear meshing with the gear 204. To the gear 205 is secured a gear 207 and the gears 205 and 207 are driven from a sleeve 208 journaled in a bearing in the frame by a gear 209 formed on the lower end of the sleeve and meshing with the gear 207. The sleeve 208 is driven from a ratchet wheel 210 mounted on a shaft 211 journaled at its lower end in the sleeve 208 through a series of pawls 212, see Fig. 19, carried by the sleeve 208 and engaging the teeth of the ratchet wheel. The pawls 212 are respectively pivoted at 213 upon oscillatory levers 214 pivoted on studs 215 carried by a flange 216 formed at the upper end of the sleeve 208, and the pawls are acted upon by coiled springs 217 which yieldingly hold the pawls in engagement with the ratchet wheel. The angular positions of the pawl carrying levers 214 on their respective pivot studs are controlled by a non-rotating adjustable ring 218 pivoted on a stud 219 and having a circular groove 220 in which engage rolls 221 mounted on the respective levers. The shaft 211 is driven from a shaft 222 located in alignment therewith through the engagement of a clutch member 223 formed on the upper end of the shaft 211 with a clutch member 224 mounted on the shaft 222 to rotate therewith and movable longitudinally of said shaft into and out of engagement with the clutch member 223. In the illustrated construction, the clutch member 224 is formed with a diametrical key 225 engaging in a slot in an enlargement formed on the lower end of the shaft 222, and said clutch member is normally held in engagement with the clutch member 223 by the action of coiled springs 226. The shaft 222 is driven in timed relation to the sewing cam shaft 58 through a spiral gear 227 secured to the upper end of the shaft 222 and meshing with the spiral gear 56. As clearly shown in the drawings the gears 209, 207, 205, 204, 202, 201, 200 and 199 are so proportional as to produce a considerable reduction in speed so that the correcting cam shaft is driven at a relatively slow speed as compared with that of the sleeve 208.

The speed at which the sleeve 208 is driven from the ratchet wheel 210 is controlled by the position of the ring 218. The angular positions of the levers 214 on their respective pivot studs during their rotation with the sleeve 208 is controlled by the ring which is adjustable about the stud 219 in a plane substantially paralled with the plane of rotation of the sleeve. The parts are constructed and arranged, however, so that in one angular position of the ring the center of the groove 220 lies in the axis of the sleeve, or that the groove is concentric with the sleeve and with the path of rotation of the axes of the levers 214. Obviously, with the ring in other angular positions the groove will be eccentric to the sleeve. With the ring located so that the groove is concentric with the sleeve 208 the levers will have no angular movement on their respective pivot studs during their rotary movement with the sleeve, and the sleeve will be driven by the ratchet wheel 210 through the pawls 212 at the same speed as the ratchet wheel. When the ring, however, is adjusted so that the groove 220 is eccentric to the sleeve 208, as shown in Fig. 19, the levers will be oscillated about their pivot studs during their rotative movement with the sleeve, each lever swinging in one direction about its pivot stud during half of each revolution of the sleeve, and in the opposite direction during the remaining half of each revolution. During the swinging movement of each of the pawl carrying levers inwardly toward the axis of the sleeve the pawl carried thereby is first engaged with one of the teeth on the ratchet wheel 210, and the pawl and the lever then have a toggle action and operate to advance the pivot stud of the lever and the sleeve at a greater speed than the speed of rotation of the ratchet wheel, while during the swinging movement of the lever outwardly away from the axis of the sleeve, the pawl is advanced about the periphery of the ratchet wheel. The sleeve will always be driven from the ratchet wheel through the pawl mounted on the lever which has the most rapid inward movement, the other pawls then resting idly upon the ratchet wheel. With the ring 218 adjusted, in a position eccentric to the sleeve 208, the speed of rotation of the sleeve will be equal to the speed of rotation of the ratchet wheel 210 plus the increment in speed due to the angular movement of each of the pawl carrying levers about its pivot stud during its rotation. The amount of this increment will depend upon the extent of the adjustment of the ring from a position concentric with the sleeve. It will thus be seen that with the ring 218 located so that the groove 220 is concentric with the sleeve 208, the sleeve will be driven from the ratchet wheel 210 through the pawls at a minimum speed, and that the speed at which the sleeve is driven will be increased by an adjustment of the ring so that the groove is eccentric to the sleeve, the extent of the increase in the speed of rotation of the sleeve depending upon the extent of the adjustment of the ring.

During the sewing operation the pattern cam shaft is driven from the shaft 222 through the ratchet wheel 210, and the pawls 212 at a speed depending upon the adjustment of the ring 218. The ring 218 is adjusted to adjust the speed at which the correcting cam shaft is driven in accordance with the size of the shoe placed in the machine. The adjustment of the ring is effected through mechanism controlled by the position of the fulcrum carrying lever 171 which, as described above, is adjusted in accordance with the size of the shoe to be sewn by the placing of the shoe in position in the machine for the starting of the seam. In the present construction, this mechanism is adjusted to adjust the ring 218 upon the depression of the treadle to start the machine. As illustrated in the drawing, the ring 218 is formed with a series of gear teeth 228 meshing with the teeth of a gear segment 229 carried by an arm 230 secured to the upper end of a rock shaft 231. A longitudinally movable controller bar 232 is pivoted at one end at 233 to another arm 234 secured to the lower end of the rock shaft and is movably supported adjacent its other end by a link 235 connecting the controller bar with one arm of a lever 236 pivoted on a stud 237. The latter end of the controller bar 232 engages between spaced arms formed on the fulcrum carrying lever 171 and the controller bar is formed with oppositely inclined surfaces 238 leading to a recess 239 adapted to receive a roll 240 mounted on the lever 171. When the machine is at rest after a shoe has been placed on the jack the controller bar 232 is held in its rearward position by the action of a spring 241 as shown in Figure 4, the roll 240 then being disengaged from the recess 239. Upon the depression of the starting treadle to start the machine, the controller bar 232 is swung forwardly about its pivotal connection with the arm 234 to engage the roll 240 in the recess 239 by means of pins 242 mounted on a longitudinally movable bar 243, and arranged to engage spaced arms on the lever, see Fig. 14.

The bar 243 is mounted to slide in guides in the frame of the machine and is arranged to be actuated from the starting treadle in starting the machine, and to this end the left hand end of the rod is connected by the link 244 with one arm of a bell crank lever 245 pivoted on a stud 246. The other arm of the bell crank lever is connected by a treadle rod 247 with the starting treadle 248 which is pivoted on a stud 249 at the base of the machine and is normally held in elevated position by means of a coiled spring 250. Through the connections described upon the depression of the treadle 248, the bar 243 is moved longitudinally to the right, this movement of the bar operating to cause the engagement of the members 53 and 54 of the main driving clutch to start the machine in the manner hereinafter described. After the machine is started the treadle is released and is moved upwardly by the action of the spring 250 and the bar 243 is moved back to the left to its normal position. During the movement of the bar to the right produced by the depression of the treadle, the pin 242 engages the lever 236 and actuates said lever to swing the controller bar 232 forwardly.

Before the depression of the treadle to start the machine, the shoe is placed in the machine in the correct position for starting of the seam, thereby adjusting the fulcrum carrying lever 171 in accordance with the size of the shoe. When the controller bar 232 is swung forwardly to engage the roll 240 in the recess 239, if the recess is not in position to receive the roll the roll engages one of the inclined surfaces 238 on the controller bar, and the controller bar is thereby shifted longitudinally in one direction or the other until the recess registers with the roll. The controller bar is thus located in a longitudinal position corresponding with the position of the fulcrum carrying lever 171, and through the connections described between the controller bar and the ring 218 the ring is adjusted to adjust the speed of the pattern cam shaft in accordance with the size of the shoe to be sewn.

The mechanism for locking the fulcrum carrying lever 171 in position during the sewing operation, see Fig. 4, comprises a rod 251 pivotally connected at one end with the rear end of the fulcrum carrying lever 171, and engaging in a sleeve 252 pivoted on a stud 253, and a pair of locking levers 254 pivoted to the sleeve on studs 255 and formed with cam shaped inner ends arranged to engage the rod 251. The locking levers 254 at their outer ends carry pins 256 engaging in slots formed in the opposite ends of a cross bar 257, to the central part of which is pivotally connected a sleeve 258 having a yielding connection through a coiled spring 259 with the rear end of a rod 260 engaging in the sleeve. The rod 260 is pivotally connected at its forward end with the controller bar 232. As the controller bar is swung forwardly upon the depression of the treadle, the rod 260 is moved forwardly therewith, thereby actuating the locking levers 254 to lock the rod 251 in the sleeve 252.

The controller bar is held in forward position during the sewing operation by means of a spring actuated latch 261 pivoted upon a stud 262 and arranged to engage a projection 263 on the hub of the lever 236. As the bar 243 is moved longitudinally to the right upon the depression of the treadle thereby swinging the lever 236 into the position shown in Figure 14, the latch is swung by its actuating spring into position to engage the projection 263 on said lever and holds said lever in position as the bar 243 returns to its initial position upon the release of the treadle. The latch 261 remains in engagement with the projection 263 during the sewing of the seam about a shoe and also after the completion of the sewing operation until another shoe is placed on the shoe supporting jack. As another shoe is placed on the jack the latch is thrown out allowing the controlling bar 232 to swing back to its rearward position under the action of the spring 241.

After a shoe has been placed by the operator on the jack and has been adjusted in a predetermined position with relation to the jack and clamped in adjusted position automatically by the action of the jack mechanism, the operator places the shoe in the machine with the channel guide roll in engagement in the channel of the insole at the proper point for the starting of a seam, and then depresses the starting treadle to engage the main driving clutch to start the machine. During the sewing operation the members 53 and 54 of the main driving clutch are held in engagement and the machine is driven at a speed depending upon the speed of the driving shaft 51. When the sewing operation is completed the members of the main driving clutch are disengaged and the sewing mechanism is stopped through the action of automatically acting devices. The mechanism for disengaging the clutch and stopping the sewing mechanism is arranged to be thrown into operation automatically at a predetermined point in the operation of the machine, and the sewing mechanism is stopped with the sewing cam shaft 58 in a predetermined angular position. In the illustrated construction, see Figs. 15, 16, 17, 22, 23 and 24 the sleeve 55 which carries the driven member of the main driving clutch also carries a brake member 264 arranged to engage a brake shoe 265 formed on the frame of the machine. The sleeve 55 is arranged to slide longitudinally of the counter-shaft 51 to carry the driven clutch member 54 into and out of engagement with the driving clutch member 53, and to carry the brake member 264 into and out of engagement with the brake shoe 265. The sleeve is acted upon by a coiled spring 266 interposed between the lower end of the sleeve and a flange on a bushing 267 surrounding the counter-shaft 51 and resting on a shoulder on the frame which normally maintains the sleeve in its upper position with the driven clutch member in engagement with the driving clutch member and with the brake member 264 disengaged from the brake shoe 265.

The mechanism for moving the sleeve 55 longitudinally to disengage the clutch and engage the brake comprises an oscillatory bell crank lever 268 pivoted on a stud 269 and carrying a cam roll 270 at the end of the laterally extending arm thereof which engages in a cam groove 271 in the sleeve 55. Said mechanism also comprises a locking pin 272 mounted to slide longitudinally in a carrier 273 and arranged to engage in a recess 274 in the downwardly extending arm of the bell crank lever 268. The carrier 273, see Figs. 22, 23 and 24, is mounted to slide longitudinally in suitable guides in the frame of the machine and is acted upon by a coiled spring 275 surrounding a rod 276 forming part of the carrier 273 and interposed between the outer end of an adjustable screw threaded sleeve 277 through which the rod slides and a nut 278 threaded on the outer end of the rod. The spring 275 normally holds the carrier 273 in position with a shoulder on the carrier in engagement with the inner end of the sleeve 277. The locking pin 272 is acted upon by a coiled spring 279 which tends to move the same rearwardly into engagement with the bell crank lever 268. During the normal operation of the machine, however, the locking pin is held in forward position out of engagement with the arm of the bell crank lever so that the lever is oscillated idly by the action of the cam groove 271. In stopping the machine the locking pin is released and forced rearwardly by the action of the spring 279 against the forward side of the downwardly extending arm of the bell crank lever 268, and when the recess in the lever registers with the locking pin the locking pin is engaged in the recess thus locking the lever to the carrier 273. Obviously the lever 268 is actuated by the cam groove 271 to bring the recess 274 into registration with the locking pin 272 and the carrier 273 is locked to the lever at a definite predetermined point in the rotation of the sewing cam shaft 58. This occurs preferably when the roll 270 is in the upper idle portion of the cam groove. After the carrier 273 is locked to the bell crank lever 268 by the locking pin 272 as the cam roll 270 reaches a downward throw in the cam groove 271, the bell crank lever 268 is swung in a direction to move the carrier 273 longitudinally to the right, Fig. 22, against the tension of the spring 275. The cam roll 270 then passes into the lower idle portion of the cam groove 271, and when the sewing cam shaft 58 arrives in stopping position the cam roll engages in an upward throw in the cam groove. During the passage of the cam roll through this upward throw in the cam groove the sleeve 55 is moved downwardly by the cooperative action of the cam groove and the cam roll to disengage the driven clutch member 54 from the driving clutch member 53 and to engage the brake member 264 with the brake shoe 265. In order to render this upward throw in the cam groove effective to move the sleeve 55 downwardly, a latch lever 280 is provided to prevent the return of the carrier 273 to its normal limiting position after it is moved longitudinally to the right by the action of the lever 268 during the passage of the cam roll 270 through the downward throw in the cam groove. The latch lever 280 is pivoted on a stud 281 and is formed with a projection 282 for engagement with a projection 283 on the carrier 273. The latch lever 280 is normally held in lowered position with the projection 282 on the lever beneath the projection 283 on the carrier, as shown in Fig. 23, and is acted upon by a coiled spring 284 which tends to swing the same upwardly into acting position. As the carrier 273 is moved to the right during the passage of the cam roll 270 through the downward throw in the cam groove 271, the lever 280 is swung upwardly by the action of the coiled spring 284 into the position shown in Fig. 24 with the projection 282 at the left of the projection 283. As the carrier 273 moves back to the left during the passage of the cam roll 270 through the upward throw in the cam groove 271, the projection 282 on the latch lever engages the projection 283 on the carrier thereby arresting the return movement of the carrier before the carrier reaches its normal limiting position, as shown in Fig. 22. The stopping of the return movement of the carrier by the latch lever renders the cam throw effective to move the sleeve 55 and the sleeve is moved downwardly to disengage the clutch and engage the brake by the cooperative action of the cam groove and the cam roll.

The mechanism for holding the locking pin in forward position out of engagement with the lower arm of the bell crank lever 268 comprises a lever 285 pivoted on a stud 286, one arm of which is provided with spaced projections embracing the portion of the carrier 273 in which the locking pin slides and arranged to engage a collar 287 secured to the forward end of the locking pin. The other arm of the lever 285 carries a gear segment 288 which meshes with a gear segment 289 formed on one arm of a lever 290 pivoted on a stud 291. The other arm of the lever 290 is pivotally connected by means of a pin 292 with the upper end of a vertically movable rod 293. The rod 293 also controls the position of the latch lever 280 through the engagement of the rear end of the pin 292 in a slot in the latch lever. In starting the machine the rod 293 is depressed by the operator and in stopping the machine said rod is released and is then moved upwardly by the action of a coiled spring 294. When the rod 293 is depressed the lever 285 is actuated from the lever 290 to move the locking pin 272 forwardly out of locking engagement with the bell crank lever 268, allowing the sleeve 55 to be moved upwardly by the action of the coiled spring 266 to engage the clutch and disengage the brake and the latch lever 280 is moved downwardly out of acting position allowing the carrier 273 to be moved to the left into its normal position by the action of the coiled spring 275. As the rod 293 upon its release is moved upwardly under the action of the coiled spring 294 the locking pin 272 is forced rearwardly against the arm of the bell crank lever 268, and when the recess in the arm of said lever registers with the pin, the pin snaps into the recess, thus connecting the lever with the carrier 273. The upward movement of the rod 293 also releases the latch lever 280 allowing said lever to move upwardly into acting position under the action of the coiled spring 284 as the carrier 273 is moved to the right.

The rod 293 is arranged to be depressed by the longitudinal movement to the right imparted to the bar 243 by the depression of the treadle. The rod 293 is pivotally connected at 295 with a second rod 296 which is mounted to slide vertically in guides in the frame and carries at its lower end a collar 297. The collar 297 is engaged by spaced projections formed on a lever 298 pivoted at 299 on the frame in the line of movement of the longitudinally movable bar 243.

The lever 298 is engaged by the right hand end of the bar 243 as said bar is moved to the right by the depression of the treadle, and the lever is thereby actuated to depress the rod 296 and the rod 293 therewith.

The rods 296 and 293 are held in depressed position during the sewing operation by means of a latch 300, see Figs. 14 and 15, arranged to engage a projection 301 on the rod 296. The latch 300 is mounted to slide in guides on the frame toward and from the rod 296 and is acted upon by a coiled spring 302 which tends to advance the same into acting position. The lower side of the projection 301 on the rod 296 is inclined so that as the rod is depressed, the latch is retracted by the engagement of the projection therewith, and the latch snaps forward into acting position as the projection is carried below the latch. The stopping devices are thus held out of operation by the latch after the starting of the machine, allowing the treadle to be released and the bar 243 to be moved back to the left to its normal position.

When the sewing mechanism arrives at a predetermined point in the margin of the shoe chosen for the completion of the seam, the latch 300 is automatically disengaged from the projection 301 on the rod 296 allowing the stopping devices to be thrown into operation. To enable the latch to be disengaged from the projection on said rod, the latch is provided with a V-shaped notch in which is engaged a pin 303 mounted on a lever 304 pivoted on a stud 305. With this construction the latch may be retracted by the swinging movement of the lever 304 in either direction through the engagement of the pin 303 with either of the inclined faces of the latch.

The devices for stopping the sewing mechanism at the completion of the seam, see Figs. 8, 28, 30, 31 and 32 comprise a slide actuated from the feeding lever 154, a counting mechanism normally inactive but rendered active by a movement of the slide to a predetermined position and connections acting after the counting mechanism has been in operation for a predetermined number of cycles of the sewing mechanism to swing the left-hand end of the lever 308 forwardly.

The slide, see Fig. 8, is indicated at 306 and is mounted to reciprocate in guides in a bracket 307. The slide is actuated from the feeding lever 154 through connections comprising a lever 308 pivoted on a stud 309 and pivotally connected at 310 with a laterally extending arm on the feeding lever 154 and a link 311 connecting the lever 308 with the slide 306. With this construction, as the feeding lever is swung to the left to actuate the jack to feed the shoe, the lever 308 is actuated to move the slide 306 rearwardly in definite timed relation to the feeding movement imparted to the shoe.

In order that the movement of the slide 306 may be adjusted so that it will operate in the proper timed relation to the feeding movement of the shoe regardless of the size of the shoe being sewn, the fulcrum stud 309 for the lever is engaged in a slot 312 in said lever and is adjusted longitudinally of the lever in accordance with the size of the shoe placed in the machine. The fulcrum stud 309 is mounted on an arm 313 pivoted at 314 on the frame of the machine, and having a recess at its forward end in which engages a pin 315 mounted on the fulcrum carrying lever 171. With this construction as the fulcrum carrying lever 171 is adjusted in accordance with the size of the shoe to be sewn upon the placing of the shoe in operating position in the machine, the arm 313 will be adjusted from the fulcrum carrying lever to adjust the stud 309 longitudinally of the lever 308 for the size of the shoe.

The slide 306 is provided with a triangular projection 316 which, as the slide nears the limit of its rearward movement, engages a triangular projection 317 formed on one arm of a T-shaped lever 318. Another arm of this lever 318 is connected by a link 319 to a vertically arranged lever 320, see Figs. 28 and 30, which is connected to a horizontally movable plate 321 by means of a slot in the lever which is engaged by a roll 322 mounted on the rear end of the plate. The lever 320 and plate 321 control the operation of the counting mechanism, as will be hereinafter described. The lever 318 is normally maintained in central position to hold the lever 320 and the plate 321 substantially in the position shown in Fig. 28 by means of spring pressed plungers 323 mounted in the lever 318 and arranged to engage the bracket 307.

The counting mechanism comprises a lever 324 pivoted on a fixed stud 325 and carrying at its rear end a stud 326, a lever 327 pivoted on the stud 326 and formed with a ratchet segment 328, a lever 329 also pivoted on the stud 326, the upper end of which is arranged to be engaged by a projection 330 on the downwardly extending arm of a cam lever 331, the other arm of which is provided with a roll 332 engaging a cam groove in a cam disk on the sewing shaft 58, a pawl 333 pivoted at 334 on the lever 329 and arranged to engage the teeth of the ratchet segment and a pawl 335 pivoted at 336 on the frame of the machine and also arranged to engage the teeth of said ratchet segment. Normally the lever 324 is in the position shown in Fig. 28 in which position the upper end of the lever 329 lies below the projection 330 on the cam lever 331, said lever 329 then being held in stationary position in engagement with a pin 337 fixed in the frame by means of a coiled spring 338 connecting the lever with an upwardly extending arm on the lever 324. With the parts in this position the pawls 333 and 335 are held out of engagement with the ratchet segment 328 by the engagement of the pawls with a pin 339 mounted on the lever 320. The lever 327 is acted upon by a coiled spring 340 which tends to swing the lever in a counter-clockwise direction, Fig. 28, abut the stud 326 and maintains the same normally in engagement with a pin 341 mounted on the lever 329. A lever 342 is mounted upon the stud 325 at one side of the lever 324, and to an arm of the lever is pivotally connected the upper end of a rod 343. This rod is movable vertically in suitable guides in the machine frame and at its lower end is arranged to rest upon the horizontal plate 321. The plate 321 is provided with an opening 344 which can be brought into register with the the rod 343 upon a backward movement of the plate into the position shown in Fig. 30. Such a backward movement of the plate 321 is produced by the engagement of the triangular projection 316 with the projection 317 as the slide 306 approaches the end of its backward movement, through the connections hereinbefore described. The free end of the lever 342 is connected by means of a link 345 to one arm of a lever 346, the other arm of which is provided with a cam roll arranged to be acted upon by a cam surface on a cam disk secured to the sewing shaft 58. A spring 347 connected to the upper end of the link 345 acts to swing the lever 342 downwardly to the position indicated in Fig. 30 as soon as the plate 321 is moved to bring the opening 344 into registration with the rod 343. The lever 342 is provided with a lateral projection 348 arranged to act on the upstanding arm of the lever 324 and swing this lever in a direction to raise the stud 326. This movement of the lever 324 carries the upper end of the lever 329 into position to be engaged by the projection 330 on the cam lever 331 and the lever 329 is then oscillated by the cooperative action of the cam lever and spring 338 during each rotation of the sewing cam shaft 58. With the parts in the position shown in Fig. 30, the pin 339 on the lever 320 allows the pawls 333 and 335 to engage the teeth of the ratchet segment 328 and a step by step movement is imparted to the lever 327 by the action of the pawl 333 while the levers 327 and 329 are held in elevated position, the pawl 335 operating to hold the lever 327 from return movement. The engagement of the triangular projection 316 with the projection 317 is maintained only during a single cycle of operations of the sewing mechanism. Also during the first cycle of operations of the sewing mechanism after the plate 321 is moved to the position shown in Fig. 30, the lever 342 is raised by the action of the cam on the sewing shaft which engages the lever 346. This allows the plate 321 and lever 320 to return to normal position. To hold the levers 324 and 329 in elevated position to maintain the counting mechanism in action until the machine is stopped, a latch lever 349 is provided which is pivoted on a stud 350, and the rearwardly extending arm of which is provided with a projection or shoulder 351 arranged to engage the rear side of the upwardly extending arm of the lever 324. When the machine has executed a predetermined number of cycles of operation following the movement of the lever 320 into the position shown in Fig. 30, the stopping mechanism is thrown into operation through the engagement of the rearwardly extending arm of the lever 327 with the rear end of a bar 352 secured at its forward end to the lever 304. By the engagement of this arm of the lever 327 with the rear end of the bar 352, the left-hand end of the lever 304 is swung forwardly to disengage the latch 300 from the projection 301 on the rod 296. Before the machine finally comes to rest the latch lever 349 is actuated to release the lever 324 by means of a rod 353 pivoted at its forward end to an arm 354 secured to a rock shaft 355 and extending through an opening in an upwardly extending arm on the latch lever 349, the rod having a nut 356 mounted thereon at the rear of said arm. After the stopping mechanism is thrown into operation the rock shaft 355 is actuated in a manner hereinafter described to swing the arm 354 forwardly, thereby engaging the nut 356 with the upwardly extending arm of the latch lever and actuating the latch lever to release the lever 324. Upon the release of the lever 324 by the latch lever the lever 324 is swung back into the position shown in Fig. 28 by the action of the spring 338, thereby throwing the parts of the counting mechanism out of operating positions.

The mechanism for actuating the rock shaft 355 to reset the counting mechanism comprises an arm 357 secured to one end of the rock shaft, an arm 358 pivoted to turn loosely on a second rock shaft 359 and a link 360 connected at its opposite ends by universal joints with the arm 357 and with the arm 358. An arm 361 is secured to the rock shaft 359 and is arranged to be actuated from an eccentric 362 through an eccentric strap 363 and pitman 364. This eccentric 362 is normally inactive but is thrown into operation, as will be hereinafter described, as the sewing mechanism is stopped. The arm 358 is arranged to be moved in a counter-clockwise direction through a spring 365 connecting said arm with the arm 361, and the arm 358 is arranged to be actuated in the opposite direction by the engagement of a projection 366 formed on the hub of the arm 361 and engaging in a recess in the hub of the arm 358 with the forward or right hand face of said recess. The movement of the arm 358 in a counter-clockwise direction is limited by the engagement of an abutment screw 367 mounted in a projection formed on the hub of said arm with the frame of the machine and the recess in which the projection 366 engages is considerably wider than such projection so as to allow a certain amount of lost motion between the arm 361 and the arm 358. With this construction the arm 358 is actuated in a counter-clockwise direction during the first part of the movement of the arm 361 imparted thereto by the eccentric and the movement of the arm 358 is limited by the engagement of the abutment screw 367 with the frame of the machine, the arm 361 continuing its movement after the arm 358 reaches its limiting position.

The eccentric 362 is journaled on a boss 368 on the frame of the machine. The driving mechanism for the eccentric comprises a shaft 369 the upper end of which engages in a bearing formed in the lower end of the counter-shaft 51, and the lower end of which engages in a bearing in the boss 368. The shaft 369 is driven from the shaft 51 at a relatively slow speed by means of a gear 370 formed on the lower end of the shaft 51, a gear 371 journaled on a stud 372 secured in the frame, a gear 373 secured to the gear 371, and a gear 374 secured to the shaft 369 and meshing with the gear 373. Upon the lower end of the shaft 369 is mounted a sleeve 375, said sleeve being splined to the shaft so that it rotates therewith and is movable longitudinally of the shaft. Mounted upon the upper end of the sleeve 375 and preferably formed integral therewith is a toothed clutch member 376 arranged to engage a toothed clutch member 377 secured to the eccentric 362. The position of the sleeve 375 on the shaft 369 is controlled by means of a lever 378 pivoted on a shaft 379 and provided with tapered rolls 380 mounted on studs secured in spaced arms on said lever embracing the sleeve, said rolls engaging in a tapered groove 381 in the sleeve. The lever 378 is normally located in the positions shown in Figs. 25 and 26 so as to hold the sleeve 375 in position on the shaft 369 with the clutch members 376 and 377 disengaged. The lever is held in the position shown in these figures by means of a spring pressed detent pin 382, having a tapered forward end arranged to engage a corresponding recess in an upstanding projection 383 on said lever. Upon stopping the sewing mechanism the lever 378 is actuated to move the sleeve 375 upwardly to engage the clutch members 376 and 377.

The mechanism for actuating the lever 378 to engage said clutch members comprises a rod 384 pivotally connected at its upper end with an arm 385 formed on the hub of the arm 386, and provided adjacent its lower end with lateral projections 387 and 388. The projections 387 and 388 on the rod are normally located between the forward end of a lever 389 pivoted on a stud 390 and a lateral projection 391 formed on the forward end of the lever 378, as shown in Fig. 25. The position of the rod 384 upon stopping the sewing mechanism is controlled by a lever 392 pivoted on the stud 305 above the lever 304 and provided with pins 393 between which the lower end of the rod 384 engages. The lever 392 is normally held in central position with relation to the lever 304 by means of spring pressed plungers 394 mounted in the lever 304 on opposite sides of the stud 305 and arranged to engage the lever 392. In stopping the sewing mechanism at the completion of a seam the left hand end of the lever 304 is swung forwardly to disengage the latch 300 from the projection 301 on the rod 296. During this movement of the lever 304 the lever 392 is held stationary by the engagement of the lower end of the rod 384 between the pins 393, the rod being held at this time from forward or rearward movement, as shown in Fig. 25. As the arm 386 is swung upwardly by the action of the cam lever 395, the projection 387 on the rod is carried above the lateral projection 391 on the lever 378 and the lever 392 is then swung forwardly by the action of one of the spring pressed plungers 394, thereby actuating the rod to locate the projection 387 thereon above said lateral projection on the lever 378 as shown in Fig. 26. With the parts in this condition, as the arm 386 is swung downwardly, thereby depressing the rod 384, the projection 387 on the rod engages the lateral projection 391 on the lever 378 and the lever is actuated to move the sleeve 375 upwardly on the shaft 369, thereby engaging the clutch member 376 with the clutch member 377. Through the engagement of the clutch members 376 and 377 the eccentric 362 is driven through substantially a complete revolution before the machine finally comes to rest.

After the sewing mechanism is stopped, the jack is swung forwardly out of operating position and is held in forward position during the turning movement imparted thereto to restore the same to its initial position. The mechanism for swinging the jack forwardly out of operating position is also actuated from the eccentric 362. In the construction shown, see Figs. 11, 14, 15, 16 and 33 to 36 inclusive, a rock shaft 396 is mounted to turn in a bearing in the frame in alignment with the shaft 359 and is connected with the latter shaft by means of a diametrical key 397 engaging in a corresponding slot formed in an enlargement on the lower end of the shaft 359. To the lower end of the shaft 396 is secured an arm 398 carrying a gear segment 399 meshing with a gear segment 400 secured to a rock shaft 401 mounted to turn in a bearing in a bracket 402 on the frame. A lever 403 is pivoted on the shaft 401 and is connected with the shaft by means of a coiled spring 404. A slide 405 having a central opening therethrough is mounted to slide in guides in the outer portion of the lever 403 and the outer cross bar of said slide is arranged to engage a projection 406 formed on a bar 407 connected with the jack. The forward end of the bar 407 is connected by a universal joint 408 with the jack, and the rear end of said bar is supported by an arm 409 pivoted at 410 on the frame of the machine. During the normal operation of the machine the gear segment 400 and the shaft 401 are held in the positions shown in Figures 14 and 34 through the connections between said gear segment and the eccentric 362, and the lever 403 is held by the action of the spring 404 in rearward position, as shown in Figure 34 with a stop projection 411 on the lever engaged with the frame of the machine. As the eccentric 362 is thrown into operation upon stopping the machine, the gear segment 400 is swung forwardly into the position shown in Figures 11, 35 and 36 and then back to its normal position.

During the forward movement of the gear segment the lever 403 is swung forwardly therewith into the position shown in said figures by the engagement of a pin 412 mounted on the gear segment with the rear side of the lever. As the lever 403 is swung forwardly the outer cross bar of the slide 405 engages the projection 406 on the bar 407 and the bar is moved forward by the lever, thereby swinging the jack forwardly about its connections with the wheel 65 to disengage the shoe from the sewing mechanism. The lever 403 after being swung forwardly into the position shown in Figures 11, 35 and 36 is held from return movement as the gear segment 400 swings back to its initial position, the returning movement of the gear segment independently of the lever winding up the spring 404. The lever, therefore, after having operated to swing the jack forwardly out of operating position holds the jack in forward position. The lever is held from return movement by means of a spring pressed latch 413 pivoted at 414 on the lever and arranged to engage a catch plate 415 on the frame as the lever is swung into forward position. The jack is held in forward position during the turning movement imparted to the jack to restore the jack to starting position, and during the removal of the shoe from the jack. Means is provided, however, which is arranged to be operated as the shoe is placed on the jack to release the latch 413 from the catch plate 415. As the shoe is placed on the jack a sharp downward push or blow is delivered to the shoe to seat the last pin in the last pin hole in the last, and to insure the depression of the rod 146 to trip the jack. This forces the shoe and the jack downwardly and the downward movement thus imparted to the jack through the movement of the bar 407 depresses the slide 405. During the downward movement of the slide the latch is thrown out by means of a rod 416 mounted to slide longitudinally in the lever 403 and connected at its lower end with the slide. The rod passes through an opening in a rearwardly projecting arm on the latch 413 and carries a collar 417 at its upper end which, as the rod is moved downwardly by the slide, engages this arm of the latch, and swings the latch to disengage the same from the catch plate 415. As the latch is thrown out the lever 403 is swung back to its initial position by the action of the spring 404.

The latch 261 is disengaged from the projection 263 on the lever 236 by the swinging movement of the lever 403 from its forward to its rearward position by means of a spring pressed plunger 418 mounted in the lever and arranged to engage an arm 419 on said latch. As the lever 403 is swung forwardly the plunger 418 is pushed back by the engagement of an inclined face on the plunger with a correspondingly inclined face on the laterally extending arm 419 of the latch so that the plunger readily passes by said arm. As the latch 261 is released from the projection 263, the controller bar 232 is swung back to its rearward position shown in Fig. 4 and the locking devices for the fulcrum carrying lever 171 are actuated to unlock said lever.

As the eccentric 362 completes a single revolution the clutch carrying sleeve 375 is actuated to disengage the driving clutch member 376 carried thereby from the driven clutch member 377 carried by the eccentric. To this end a lever 420, see Figs. 14 and 21, is pivoted on a stud 421 and is provided with gear teeth 422 meshing with gear teeth 423 formed on the lever 392. The left-hand arm of the lever carries a pivoted dog 424 having a rearwardly extending projection arranged to engage a semi-cylindrical stud 425 mounted on an arm 426 secured to the upper end of the rock shaft 396. The dog 424 has a limited pivotal movement with relation to the lever 420, and normally is held by a spring 427 in engagement with a stop 428 formed on the lever, as shown in Fig. 21. When the lever 392 is swung forwardly to cause the engagement of the clutch member 376 with the clutch member 377, the movement of the lever 420 carries the projection on the dog rearwardly into position to be engaged by the stud 425. As the arm 426 is swung to the left, Figs. 14 and 21, during the first part of the revolution of the eccentric, the stud 425 engages the projection on the dog 424 and swings the dog on its axis until the stud passes the projection. As the arm 426 is swung back to the right during the last half of the revolution of the eccentric, the stud 425 engages the projection on the dog 424 just before the eccentric completes a revolution. The dog is then held by the spring 427 in engagement with the stop 428 which prevents the same from swinging under the action of the stud 425 and the lever 420 is actuated by the engagement of the stud with the dog to swing the lever 392 rearwardly to its normal position. This movement of the lever 392 swings the rod 384 rearwardly, thereby disengaging the projection 387 on the rod from above the projection 391 on the forward end of the lever 378, and the latter lever is then swung back to normal position by the engagement of the tapered end of the plunger 382 with the tapered face of the recess in the projection 383 on said lever, thereby disengaging the clutch member 376 from the clutch member 377.

During the sewing operation the pattern cam shaft is driven through a portion of a revolution, and after the sewing mechanism is stopped at the predetermined point in the operation chosen for the completion of the seam, the pattern cam shaft is driven in the same direction as during the sewing operation through the remaining part of a revolution to bring the same to its initial position. During this movement of the pattern cam shaft, after the sewing mechanism is stopped, the jack is turned through half a revolution in a direction opposite to the direction in which it is turned during the sewing operation to bring the jack to its initial or starting position. The mechanism for imparting the rotary movement to the pattern cam shaft after the sewing mechanism is stopped, see Figs. 4 and 20, comprises a bell crank lever 429 pivoted at 430 on the frame of the machine, a pawl 431 pivoted at 432 on one arm of the bell crank lever, and a contact plate 433 secured to the gear 199 and arranged to be engaged by the pawl. The pawl is acted upon by a coiled spring 434 which tends to swing the same about its pivotal connection with the bell crank lever 429 in one direction, and the movement of the pawl in this direction is limited by the engagement of a projection on the rear end of the pawl with the central portion of hub of the bell crank lever. The bell crank lever is actuated through a rod or link 435 from the arm 398. During the sewing operation the lever 429 and the pawl 431 occupy the positions shown in Fig. 20. In the present machine the pattern cam shaft is rotated through substantially 350° during the sewing operation, and when the sewing mechanism is stopped the contact plate 433 is located substantially 10° from the point at which it started at the beginning of the sewing operation, as shown in full lines in Fig. 20. As the arm 398 is swung forwardly during the first half of a revolution of the eccentric 362, the pawl 431 is carried to the left by the movement of the bell crank lever 429, and as the arm 398 is swung back rearwardly during the last half of a revolution of the eccentric the pawl is carried to the right by the movement of the bell crank. By the engagement of the pawl with the contact plate 433 during this movement of the pawl, the gear 199 and the correcting cam shaft are turned through the remaining 10° of a revolution to bring the same to starting position.

The lever 304, after having been swung from its normal position, is swung back to normal position, upon its release, by the action of the latch 300 through the engagement of one of the inclined surfaces of the notch in the latch with the pin 303.

To prevent the starting of the machine before a shoe is applied to the jack, a pin 436 is mounted on the bar 243 in position to engage the lever 403 while said lever is in forward position. The engagement of the pin with the lever 403 will prevent the movement of the bar 243 to the right to start the machine.

Having explained the nature and object of the invention and having specifically described a machine embodying the various features of the invention in their preferred forms, what is claimed is:—

1. A machine for operating on shoes having, in combination, means for operating along the bottom margin of a shoe, a shoe supporting jack comprising means arranged to act automatically when thrown into operation to clamp the shoe in position on the jack, said jack and operating means being relatively movable to transfer the point of operation along the shoe, and mechanism acting automatically after the completion of the operation on the shoe to move the jack out of operating position and to unclamp the shoe.

2. A machine for operating on shoes having, in combination, means for operating along the bottom margin of a shoe, a shoe supporting jack comprising mechanism arranged to act automatically when thrown into operation to adjust the shoe in a predetermined position on the jack and clamp the shoe in adjusted position, said jack and operating means being relatively movable to transfer the point of operation along the shoe, and mechanism acting automatically after the completion of the operation on the shoe to move the jack out of operating position and to unclamp the shoe and restore the parts of the jack to their initial condition.

3. A machine for operating on shoes having, in combination, means for operating along the bottom margin of a shoe, a shoe supporting jack comprising mechanism arranged to act automatically when thrown into operation to clamp the shoe in position on the jack, said jack and operating means being relatively movable to transfer the point of operation along the shoe, mechanism for returning the jack to starting position after the completion of the operation on the shoe, and mechanism acting automatically after the completion of the operation on the shoe to move the jack out of operating position and unclamp the shoe.

4. A machine for operating on shoes having, in combination, means for operating along the bottom margin of a shoe, a shoe supporting jack comprising mechanism arranged to act automatically when thrown into operation to adjust the shoe in a predetermined position on the jack and to clamp the shoe in adjusted position, said jack and operating means being relatively movable to transfer the point of operation along the shoe, mechanism for returning the jack to starting position after the completion of the operation on the shoe, and mechanism acting automatically after the completion of the operation on the shoe to move the jack out of operating position and to unclamp the shoe and restore the parts of the jack to their initial condition.

5. A machine for operating on shoes having, in combination, means for operating along the bottom margin of a shoe, a shoe supporting jack comprising means for clamping the shoe in position on the jack, said jack and operating means being relatively movable to transfer the point of operation along the shoe, and mechanism acting automatically after the completion of the operation on the shoe to move the jack out of operating position and to unclamp the shoe.

6. A machine for operating on shoes having, in combination, means for operating along the bottom margin of a shoe, a shoe supporting jack comprising means for adjusting the shoe in a predetermined position on the jack, and for clamping the shoe in adjusted position, said jack and operating means being relatively movable to transfer the point of operation along the shoe, and mechanism acting automatically after the completion of the operation on the shoe to move the jack out of operating position and to unclamp the shoe and restore the parts of the jack to their initial condition.

7. A machine for operating on shoes having, in combination, means for operating along the bottom margin of a shoe, a shoe supporting jack comprising mechanism for clamping the shoe in position on the jack, said jack and operating means being relatively movable to transfer the point of operation along the shoe, mechanism for returning the jack to starting position after the completion of the operation on the shoe, and mechanism acting automatically after the completion of the operation on the shoe to move the jack out of operating position and unclamp the shoe.

8. A machine for operating on shoes having, in combination, means for operating along the bottom margin of a shoe, a shoe supporting jack comprising mechanism for adjusting the shoe in a predetermined position on the jack, and for clamping the shoe in adjusted position, said jack and operating means being relatively movable to transfer the point of operation along the shoe, mechanism for returning the jack to starting position after the completion of the operation on the shoe, and mechanism acting automatically after the completion of the operation on the shoe to move the jack out of operating position and to unclamp the shoe and restore the parts of the jack to their initial condition.

9. A machine for operating on shoes having, in combination, means for operating along the bottom margin of a shoe, a shoe supporting jack, means for supporting the jack so that the upper end of the jack and the lower end of the jack are each freely movable independently of the other in any horizontal direction, said jack and operating means being relatively movable to transfer the point of operation along the shoe, and means acting automatically to move the jack to carry the shoe out of operating position at the completion of the operation on the shoe.

10. A machine for operating on shoes having, in combination, means for operating along the bottom margin of a shoe, a shoe supporting jack, means for supporting the jack so that the upper end of the jack and the lower end of the jack are each freely movable independently of the other in any horizontal direction, said jack and operating means being relatively movable to transfer the point of operation along the shoe, and means acting automatically to swing the jack about its lower end to carry the shoe out of operating position at the completion of the operation on the shoe.

11. A machine for operating on shoes having, in combination, means for operating on a shoe, a shoe supporting jack, said jack and operating means being relatively movable to transfer the point of operation along the shoe, and means acting on the jack to move the same to carry the shoe out of operating position at the completion of the operation on the shoe arranged to be actuated to release the jack upon the jacking of another shoe.

12. A machine for operating on shoes having, in combination, means for operating on a shoe, a shoe supporting jack, said jack and operating means being relatively movable to transfer the point of operation along the shoe, mechanism for moving the jack to carry the shoe out of operating position at the completion of the operation on the shoe, a latch for holding the jack in the position into which it is moved by said mechanism, and means for disengaging the latch.

13. A machine for operating on shoes having, in combination, means for operating on a shoe, a shoe supporting jack, said jack and operating means being relatively movable to transfer the point of operation along the shoe, means for moving the jack to carry the shoe out of operating position at the completion of the operation on the shoe, a latch for holding the jack in the position into which it is moved by said means, and connections adapted to be actuated by a movement imparted to the jack in jacking a shoe for disengaging the latch.

14. A machine for operating on shoes having, in combination, means for operating on a shoe, a shoe supporting jack, said jack and operating means being relatively movable to transfer the point of operation along the shoe, devices for moving the jack to carry the shoe out of operating position at the completion of the operation on the shoe, a latch for holding said devices in position at the completion of the shoe disengaging operation, means for disengaging the latch, and a spring for returning said devices to their initial positions when the latch is disengaged.

15. A machine for operating on shoes having, in combination, means for operating on a shoe, a shoe supporting jack, said jack and operating means being relatively movable to transfer the point of operation along the shoe, means for moving the jack to carry the shoe out of operating position at the completion of the operation on the shoe, a normally stationary eccentric, and connections for actuating said means therefrom, mechanism for driving said eccentric normally disconnected therefrom, and means for connecting said driving mechanism with the eccentric after the completion of the operation on the shoe.

16. A machine for operating on shoes having, in combination, means for operating along the bottom margin of a shoe, a shoe supporting jack movable in the direction of feed by the operator to bring the shoe to starting position and movable during the operation of the machine to transfer the point of operation along the shoe, and means acting automatically at the completion of the operation on the shoe to move the jack out of operating position.

17. A machine for operating on shoes having, in combination, means for operating on a shoe, a shoe supporting jack, mechanism for changing the relative positions of the shoe and the operating means to present the shoe properly to the operating means as the point of operation is transferred along the shoe, and means acting automatically at the completion of the operation on a shoe to stop the operating means and continue said mechanism in operation until it is in position to act on the next shoe.

18. A machine for operating on shoes having, in combination, means for operating along the bottom margin of a shoe and a shoe supporting jack relatively movable to transfer the point of operation about the shoe, means to stop the operating means at the completion of the operation on the shoe, and mechanism acting automatically to bring the jack and operating means to their initial relative positions.

19. A machine for operating on shoes having, in combination, means for operating along the bottom margin of a shoe, a shoe supporting jack, mechanism for changing the relative positions of the shoe and the operating means to present the shoe properly to the operating means as the point of operation is transferred about the shoe, driving mechanism for the operating means and the position changing mechanism, auxiliary mechanism for driving the position changing mechanism, means for throwing said driving mechanism out of operation and said auxiliary mechanism into operation at the completion of the operation on the shoe, and means for thereafter throwing said auxiliary mechanism out of operation.

20. A machine for operating on shoes having, in combination, means for operating along the bottom margin of a shoe, a shoe supporting jack, mechanism driven at different speeds for shoes of different sizes, a starting treadle, and connections adjusted by the movement of the jack to bring the shoe to starting position and actuated by the starting treadle for adjusting the speed of said mechanism.

21. A machine for operating on shoes having, in combination, means for operating along the bottom margin of a shoe, a shoe supporting jack, mechanism adjusted for operation with shoes of different sizes by a movement of the jack to bring the shoe to starting position, locking devices for locking said mechanism in adjusted condition, means for actuating said devices to unlock said mechanism in applying a shoe to the jack, a starting treadle, and connections from said treadle for actuating said devices to lock said mechanism.

22. A machine for operating on shoes having, in combination, means for operating on a shoe, a shoe supporting jack, and means for preventing the starting of the machine before a shoe is applied to the jack.

23. A machine for operating on shoes having, in combination, means for operating along the bottom margin of a shoe, a shoe supporting jack, said jack and operating means being relatively movable to transfer the point of operation along the shoe, mechanism for moving the jack to carry the shoe out of operating position at the completion of the operation on the shoe, a treadle and suitable connections for starting the machine, and means for preventing the actuation of said connections by the treadle until a shoe is applied to the jack.

24. A machine for operating on shoes having, in combination, means for operating along the bottom margin of a shoe, a shoe supporting jack comprising means for clamping the shoe in position on the jack, said jack and operating means being relatively movable to transfer the point of operation along the shoe, mechanism acting automatically after the completion of the operation on the shoe to move the jack out of operating position and to unclamp the shoe, and means for preventing the starting of the machine until another shoe is applied to the jack.

25. A machine for operating on shoes having, in combination, means for operating on a shoe, a shoe supporting jack movable to transfer the point of operation along the shoe, a member movable in the direction of feed with the shoe, a connection between said member and the jack, means for moving said member comprising pivotally connected links, a connection between one of said links and said movable member, means for actuating the other of said links, a pivoted guide link for controlling the path of the pivotal connection between said links during their movement, and a pivot for said guide link adjustable in accordance with the size of the shoe to be operated upon.

26. A machine for operating on shoes having, in combination, means for operating on a shoe, a shoe supporting jack movable to transfer the point of operation along the shoe, a member movable in the direction of feed with the shoe, means for moving said member comprising pivotally connected links, a connection between one of said links and said movable member, means for actuating the other of said links, a pivoted guide link for controlling the path of the pivotal connection between said links during their movement, an adjustable pivot for said guide link, and a connection arranged to be controlled from the shoe for adjusting the pivot of said guide link in accordance with the size of the shoe to be operated upon.

27. A machine for operating on shoes having, in combination, means for operating on a shoe, a shoe supporting jack movable to transfer the point of operation along the shoe, a member movable in the direction of feed with the shoe, a connection between said member and the jack, means for moving said member comprising pivotally connected links, a connection between one of said links and said movable member, means for actuating the other of said links, a pivoted guide link for controlling the path of the pivotal connection between said links during their movement, a pivoted support for the pivot of the guide link, and a connection controlled from the shoe for adjusting said support in accordance with the size of the shoe to be operated upon.

28. A machine for operating on shoes having, in combination, means for operating on a shoe, a shoe supporting jack, means for feeding the shoe arranged to engage the shoe, mechanism for changing the relative positions of the shoe and the operating means to present the shoe properly to the operating means as the point of operation is transferred along the shoe, a member movable in the direction of feed with the shoe, means for moving said member comprising pivotally connected links, a connection between one of said links and said movable member, means for actuating the other of said links in definite timed relation to the position changing mechanism, a pivoted guide link for controlling the path of the pivotal connection between said links during their movement, a pivoted support for the pivot of said guide link, a connection controlled from the shoe for adjusting said support and the pivot of said guide link in accordance with the size of the shoe to be operated upon and means controlled from said support for adjusting the time relations of the shoe engaging feeding means and the position changing mechanism in accordance with the size of the shoe.

29. A machine for operating on shoes having, in combination, means for operating on a shoe, a shoe supporting jack, mechanism for relatively moving and guiding the shoe and operating means to transfer the point of operation along the shoe and maintain the edge of the shoe bottom in the proper position with relation to the operating means transversely of the direction of feed, mechanism for changing the relative positions of the shoe and the operating means to present the shoe properly to the operating means as the point of operation is transferred along the shoe comprising two or more sets of cams and a single set of devices arranged to be actuated by any one of said sets of cams, connections between said devices and the jack for actuating the jack, and means for supporting said devices and cams so that they may be relatively shifted to place any one of said sets of cams in operative relation to said devices.

30. A machine for operating on shoes having, in combination, means for operating on a shoe, a shoe supporting jack, mechanism for relatively moving and guiding the shoe and operating means to transfer the point of operation along the shoe and maintain the edge of the shoe bottom in the proper position with relation to the operating means transversely of the direction of feed, mechanism for changing the relative positions of the shoe and the operating means to present the shoe properly to the operating means as the point of operation is transferred along the shoe comprising two or more sets of cams mounted to rotate coaxially, a single set of cam levers, connections between said cam levers and the jack for actuating the jack, and means for shifting said cams axially to locate any one of said sets of cams in operative position with relation to said cam levers.

31. A machine for operating on shoes having, in combination, means for operating on a shoe, a shoe supporting jack, mechanism for changing the relative positions of the shoe and the operating means to present the shoe properly to the operating means as the point of operation is transferred along the shoe comprising two or more sets of cams mounted to rotate coaxially, a single set of cam levers, and connections between said cam levers and the jack for actuating the jack, a non-rotatable longitudinally movable interiorly threaded sleeve arranged to support said cams, a threaded rod engaging in the sleeve, and means for supporting the rod against longitudinal movement so that the sleeve is moved longitudinally to shift the cams axially relatively to the cam levers to place any one of said sets of cams in operative position with relation to the cam levers by the rotation of the rod.

32. A machine for operating on shoes having, in combination, means for operating along the bottom margin of a shoe, a shoe supporting jack, means for supporting the jack so that the upper end of the jack and the lower end of the jack are each freely movable independently of the other in any horizontal direction, said jack and operating means being relatively movable to transfer the point of operation along the shoe, mechanism for returning the jack to starting position after the completion of the operation on the shoe, and means acting automatically to move the jack to carry the shoe out of operating position at the completion of the operation on the shoe.

33. A machine for operating on shoes having, in combination, means for operating on a shoe, a shoe supporting jack, mechanism for changing the relative positions of the shoe and the operating means to present the shoe properly to the operating means as the point of operation is transferred along the shoe, and means acting automatically at the completion of the operation on a shoe to stop the operating means and thereafter move the shoe out of operating position.

34. A machine for operating on shoes having, in combination, means for operating on a shoe, a shoe supporting jack, a treadle and suitable connections for starting the machine, and means for preventing the actuation of said connections by the treadle until the shoe is applied to the jack.

35. A machine for operating on shoes having, in combination, means for operating on a shoe, a shoe supporting jack, and means for preventing the starting of the machine rendered inoperative by the application of a shoe to the jack.

LAURENCE E. TOPHAM.
ALFRED R. MORRILL